United States Patent
Hossain et al.

(10) Patent No.: US 12,508,574 B2
(45) Date of Patent: Dec. 30, 2025

(54) $Ga_2O_3/La_2O_3$-GAMMA $Al_2O_3$ CATALYSTS FOR $CO_2$-MEDIATED OXIDATIVE DEHYDROGENATION OF PROPANE TO PROPYLENE

(71) Applicant: KING FAHD UNIVERSITY OF PETROLEUM AND MINERALS, Dhahran (SA)

(72) Inventors: Mohammad Mozahar Hossain, Dhahran (SA); Majid Lasisi Balogun, Dhahran (SA); Mohammed S. Ba-Shammakh, Dhahran (SA); Shakeel Ahmed, Dhahran (SA); Wasim Ullah Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 329 days.

(21) Appl. No.: 18/461,883

(22) Filed: Sep. 6, 2023

(65) Prior Publication Data
US 2025/0073682 A1 Mar. 6, 2025

(51) Int. Cl.
*B01J 23/08* (2006.01)
*B01J 23/10* (2006.01)
(Continued)

(52) U.S. Cl.
CPC .............. *B01J 23/08* (2013.01); *B01J 23/10* (2013.01); *B01J 35/613* (2024.01); *B01J 35/615* (2024.01);
(Continued)

(58) Field of Classification Search
CPC ... B01J 23/08; B01J 23/10; B01J 35/40; B01J 35/612; B01J 35/613; B01J 35/615;
(Continued)

(56) References Cited

U.S. PATENT DOCUMENTS 7,002,052 B2  2/2006  Hamper et al.
7,375,049 B2  5/2008  Hayes et al.
(Continued)

OTHER PUBLICATIONS

Xu et al. ("Support effect in dehydrogenation of propane in the presence of CO2 over supported gallium oxide catalysts." Journal of Catalysis 239 (2006) 470-477) (Year: 2006).*

(Continued)

*Primary Examiner* — In Suk C Bullock
*Assistant Examiner* — Jason Y Chong
(74) *Attorney, Agent, or Firm* — Oblon, McClelland, Maier & Neustadt, L.L.P.

(57) ABSTRACT

A method for producing propylene ($C_3H_8$) via oxidative dehydrogenation (ODH) of propane includes introducing a propane-containing feed gas stream into a reactor containing an alumina-supported $Ga_2O_3/La_2O_3$ catalyst comprising $Ga_2O_3$ particles at least partially disposed on surfaces of a matrix comprising rough and irregular-sized $La_2O_3$ and alumina particles; passing the propane-containing feed gas stream through the reactor in contact with the alumina supported $Ga_2O_3/La_2O_3$ catalyst at a temperature of 500 to 600° C. to convert at least a portion of the propane to propylene ($C_3H_6$) and produce a propylene-containing gas stream leaving the reactor; and separating the propylene from the propylene-containing gas stream. The method has a propane conversion of up to 95% based on an initial weight of the propane in the propane-containing feed gas stream, and a propylene yield of up to 60% based on the propane conversion.

18 Claims, 16 Drawing Sheets

(51) Int. Cl.
| | |
|---|---|
| *B01J 35/61* | (2024.01) |
| *B01J 35/63* | (2024.01) |
| *B01J 35/64* | (2024.01) |
| *B01J 37/02* | (2006.01) |
| *B01J 37/03* | (2006.01) |
| *B01J 37/04* | (2006.01) |
| *B01J 37/08* | (2006.01) |
| *C07C 5/32* | (2006.01) |

(52) U.S. Cl.
CPC .......... *B01J 35/633* (2024.01); *B01J 35/647* (2024.01); *B01J 37/0205* (2013.01); *B01J 37/0236* (2013.01); *B01J 37/035* (2013.01); *B01J 37/04* (2013.01); *B01J 37/088* (2013.01); *C07C 5/322* (2013.01); *C07C 2523/08* (2013.01); *C07C 2523/10* (2013.01)

(58) Field of Classification Search
CPC ........ B01J 35/633; B01J 35/647; B01J 35/70; B01J 37/0205; B01J 37/0236; B01J 37/035; B01J 37/04; B01J 37/088; C07C 5/322; C07C 5/48; C07C 2523/08; C07C 2523/10; Y02P 20/52
See application file for complete search history.

(56) References Cited

U.S. PATENT DOCUMENTS

| | | |
|---|---|---|
| 10,351,487 B2 | 7/2019 | Smith et al. |
| 10,933,405 B2 | 3/2021 | Fridman et al. |
| 11,548,839 B2 | 1/2023 | Nath et al. |
| 2017/0233312 A1* | 8/2017 | Hossain ............... C07C 5/42 585/656 |

OTHER PUBLICATIONS

Balogun et al. ("CO2 Assisted Oxidative Dehydrogenation of Propane to Propylene over Fluidizable MoO3/La2O3-γAl2O3 Catalysts ." Journal of CO2 Utilization 42 (2020) 101329) (Year: 2020).*

Daresibi et al. ; Atomic layer deposition of Ga2O3 on γ-Al2O3 catalysts with higher interactions and improved activity and propylene selectivity in CO2-assisted oxidative dehydrogenation of propane ; Applied Catalysis A: General, vol. 655 ; Apr. 5, 2023 ; 4 Pages.

Madduluri et al. ; La2O3 promotional effect to Co3O4/γ-Al2O3catalyst in the oxidative dehydrogenation of ethylbenzene with CO2 as soft oxidant ; Journal of Saudi Chemical Society 23 ; Oct. 23, 2018 ; 13 Pages.

* cited by examiner

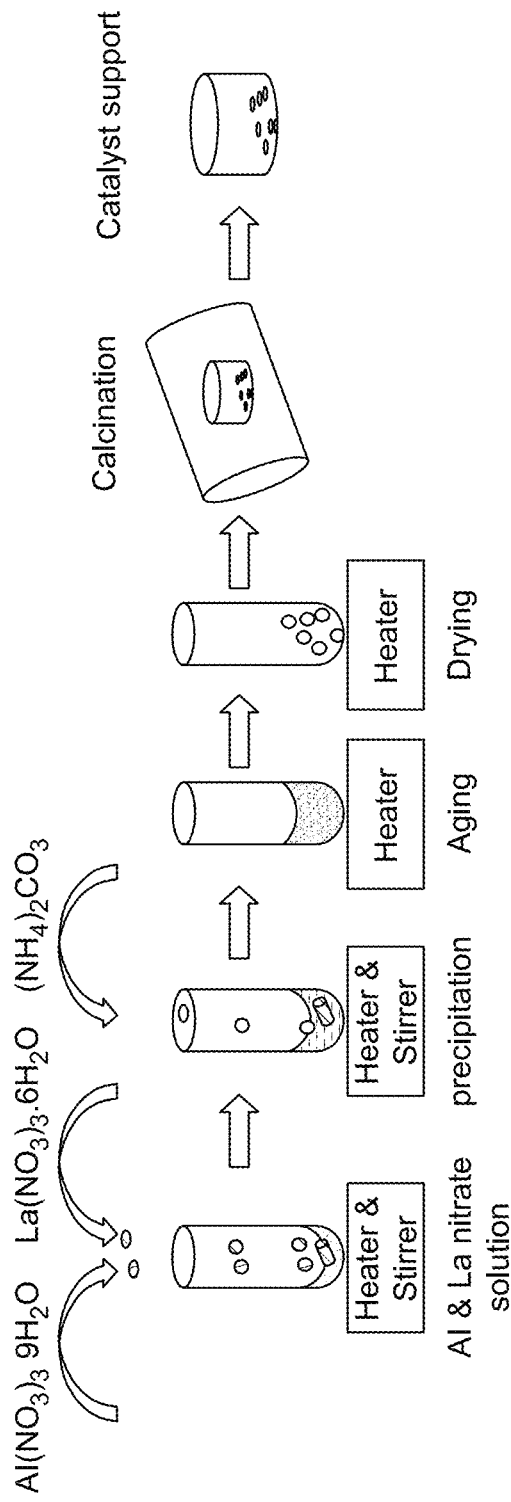
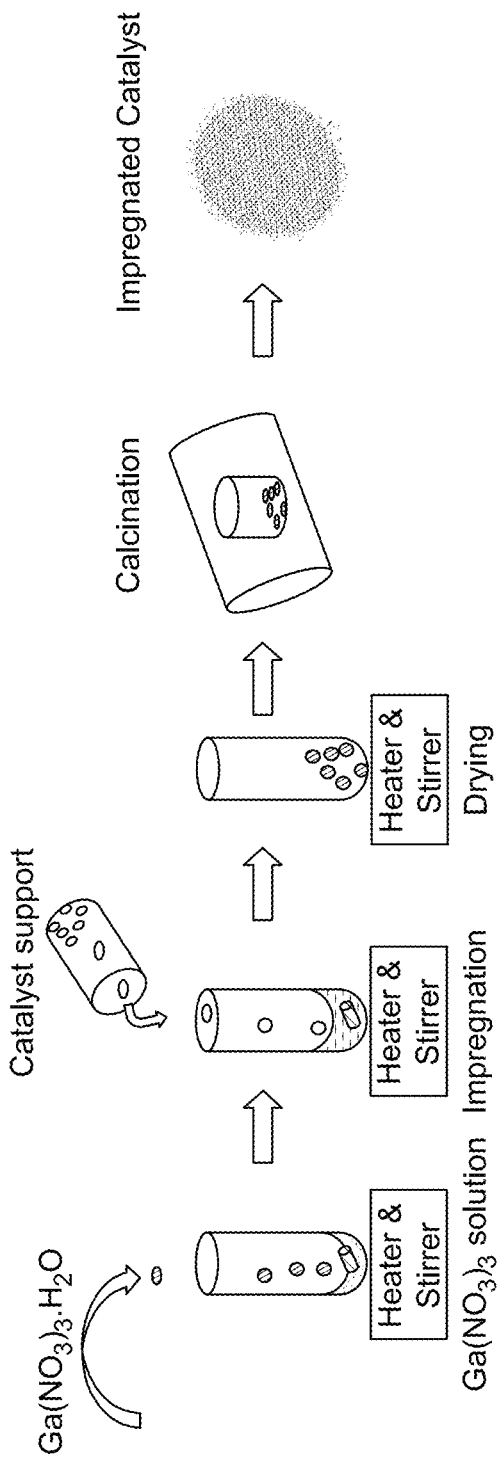
FIG. 2A
FIG. 2B

Ga$_2$O$_3$/La$_2$O$_3$-GAMMA Al$_2$O$_3$ CATALYSTS FOR CO$_2$-MEDIATED OXIDATIVE DEHYDROGENATION OF PROPANE TO PROPYLENE

STATEMENT OF ACKNOWLEDGEMENT

This research was supported by to the Deanship of Research Oversight and Coordination (DROC) at King Fahd University of Petroleum and Minerals (KFUPM) under the project DF191028, and by the Interdisciplinary Research Center for Hydrogen & Energy Storage at KFUPM for catalyst characterizations.

BACKGROUND

Technical Field

The present disclosure is directed to oxidative dihydrogen of propane (ODH), particularly to a method of producing propylene via ODH using a Ga$_2$O$_3$/La$_2$O$_3$-γAl$_2$O$_3$ composite catalyst.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Propylene is an essential organic chemical considered a building block for the synthesis of several key industrial products including polypropylene, acrolein, acrylic acid, and other relevant chemicals we encounter daily. The growing global demand for propylene, at an annual growth rate of 5%, will touch approximately 0.2 billion tons by the end of 2030. In order to cope with the increasing propylene demand, the synthesis of propylene in an efficient way becomes vital. Historically, propylene has been generated through methods such as steam cracking of naphtha, and refinery-based fluid catalytic cracking. Nonetheless, these processes yield diminished propylene selectivity even under elevated temperature conditions. In response, propylene synthesis via propane dehydrogenation has emerged as an efficient and green route that has gained scientists' attraction because of the abundant propane supply stemming from the advancement of shale gas technology.

The hydrogenation of propane encompasses direct propane dehydrogenation [DPH, eq (1)] and the oxidative propane dehydrogenation [OPDH, eq (2) and eq (3)] routes.

$$C_3H_8 \rightarrow C_3H_6 + H_2 \quad \Delta H_{298}^0 = +125 \text{ KJ/mol} \quad (1)$$

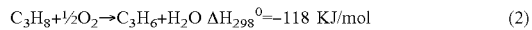
$$C_3H_8 + \tfrac{1}{2}O_2 \rightarrow C_3H_6 + H_2O \quad \Delta H_{298}^0 = -118 \text{ KJ/mol} \quad (2)$$

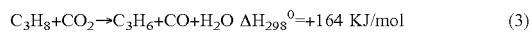
$$C_3H_8 + CO_2 \rightarrow C_3H_6 + CO + H_2O \quad \Delta H_{298}^0 = +164 \text{ KJ/mol} \quad (3)$$

DPH serves as an economically viable process for propylene production, boasting commercial adoption through technologies such as KBR-licensed Superflex, and UOP-licensed Oleflex. However, the utilization of expensive platinum- and/or chromium-based catalysts raises noteworthy environmental concerns. The oxidative route involving O$_2$ [O$_2$—OPDH, eq (2)], a non-equilibrium limited exothermic reaction, presents several notable advantages. Despite significant progress in the field of O$_2$—OPDH, it is still challenging to avoid olefin over-oxidation due to the stronger oxidative nature of oxygen.

To overcome the challenge of olefin over-oxidation, a moderate oxidant, such as carbon dioxide (CO$_2$), in place of oxygen can be utilized. This new oxidative route is CO$_2$—OPDH [eq (3)]. Given the imperative of combating climate change and global warming, the necessity for capturing and utilizing CO$_2$, a major greenhouse gas, has become increasingly evident. However, the activation of CO$_2$ presents a hurdle due to its thermodynamic stability. Therefore, the development of an effective catalyst capable of producing propylene from CO$_2$—OPDH is of utmost urgency.

Chromium-based catalysts, due to their high activities, continue to dominate in CO$_2$—OPDH. Nonetheless, as previously mentioned, chromium is not only toxic but also detrimental to the environment. Hence, the pursuit of an effective, chromium-free catalyst has become imperative. Chromium-free catalysts such as Mo$_2$C [Sullivan, M. M.; Bhan, A. Effects of oxygen coverage on rates and selectivity of propane-CO$_2$ reactions on molybdenum carbide. J. Catal. 2018, 357, 195-205], Pd/CeZrAlO$_x$ [Nowicka, E.; Reece, C.; Althahban, S. M.; Mohammed, K. M. H.; Kondrat, S. A.; Morgan, D. J.; He, Q.; Willock, D. J.; Golunski, S.; Kiely, C. J.; Hutchings, G. J. Elucidating the role of CO$_2$ in the soft oxidative dehydrogenation of propane over Ceria-based catalysts. ACS Catal. 2018, 8, 3454-3468], Fe-doped CeO$_2$ [Wang, H.; Tsilomelekis, G. Catalytic performance, and stability of Fe-doped CeO$_2$ in propane oxidative dehydrogenation using carbon dioxide as an oxidant. Catal. Sci. Technol. 2020, 10, 4362-4372 Wang, H.; Tsilomelekis, G. Catalytic performance, and stability of Fe-doped CeO$_2$ in propane oxidative dehydrogenation using carbon dioxide as an oxidant. Catal. Sci. Technol. 2020, 10, 4362-4372], ZnO/HZSM-5, [Ren, Y.; Zhang, F.; Hua, W.; Yue, Y.; Gao, Z. ZnO supported on high silica HZSM-5 as new catalysts for dehydrogenation of propane to propene in the presence of CO$_2$. Catal. Today 2009, 148, 316-322], WO$_x$—VO$_x$/SiO$_2$ [Ascoop, I.; Galvita, V. V.; Alexopoulos, K.; Reyniers, M.-F.; Van Der Voort, P.; Bliznuk, V.; Marin, G. B. The role of CO$_2$ in the dehydrogenation of propane over WOx-VOx/SiO$_2$. J. Catal. 2016, 335, 1-10], In/HZSM-5 [Tian, H.; Liao, J.; Zha, F.; Guo, X.; Tang, X.; Chang, Y.; Ma, X. Catalytic performance of In/HZSM-5 for coupling propane with CO$_2$ to propylene. Chemistry Select 2020, 5, 3626-3637], In$_2$O$_3$—O$_x$ [Chen, M.; Xu, J.; Liu, Y.-M.; Cao, Y.; He, H.-Y.; Zhuang, J.-H. Supported indium oxide as novel efficient catalysts for dehydrogenation of propane with carbon dioxide. Appl. Catal., A 2010, 377, 35-41], and Ga$_2$O$_3$—Al$_2$O$_3$ [Xiao, H.; Zhang, J.; Wang, P.; Wang, X.; Pang, F.; Zhang, Z.; Tan, Y. Dehydrogenation of propane over a hydrothermal-synthesized Ga$_2$O$_3$—Al$_2$O$_3$ catalyst in the presence of carbon dioxide. Catal. Sci. Technol. 2016, 6, 5183-5195], have been reported for their catalytic performances.

Gallium (Ga), among the catalysts mentioned above, is found to be a promising alternative to the environmentally harmful chromium. Gallium oxide (Ga$_2$O$_3$)-based catalysts have been investigated for CO$_2$—OPDH [Xiao, H.; Zhang, J.; Wang, P.; Wang, X.; Pang, F.; Zhang, Z.; Tan, Y. Dehydrogenation of propane over a hydrothermal-synthesized Ga$_2$O$_3$—Al$_2$O$_3$ catalyst in the presence of carbon dioxide. Catal. Sci. Technol. 2016, 6, 5183-5195] and CO$_2$-OEDH (where E represents ethane). Moreover, depending on Ga species, Ga facilitates C—H activation, which in turn improves propylene selectivity. The development of an oxidative catalyst suitable for light alkane dehydrogenation requires a) the redox characteristics, i.e., the activity and selectivity is a function of the lattice oxygen species of the catalyst, and molecular oxygen species of an oxidizing agent are less effective, b) the presence of isolated active sites which facilitates minimizing the oxidation of the product.

The selection of an appropriate support material may enhance both the activity and durability of metal oxide-based catalysts. Within the spectrum of oxide supports such as alumina ($Al_2O_3$), silica ($SiO_2$), and titania ($TiO_2$), $Al_2O_3$ provides promising textural and mild acidic characteristics suitable for redox active metal catalysts. However, phase transformation and sintering at elevated temperatures are the drawbacks of $Al_2O_3$. In order to cope with the drawbacks associated with $Al_2O_3$, i.e., to enhance the activity and thermal stability, a secondary metal oxide such as cerium, lanthanum, and/or zirconium may be incorporated into $\gamma$-$Al_2O_3$.

Lanthanum oxide or lanthana ($La_2O_3$) is found to be a promising material that promotes basic catalyst properties [Y. C. Sharma, B. Singh, J. Korstad, Latest developments on application of heterogeneous basic catalysts for efficient and eco-friendly synthesis of biodiesel: A review, Fuel. 90 (2011) 1309-1324]. Furthermore, lanthanum incorporation may also improve the metal dispersion, specific surface area of the catalyst, catalyst fluidizability, thermal stability, catalyst reducibility, $CO_2$ adsorption capacity, and the acidic properties of the support. The role of different oxide supports such as $Al_2O_3$, $TiO_2$, $ZrO_2$, $SiO_2$, and MgO for $Ga_2O_3$-based catalysts during OPDH with and without $CO_2$ has been investigated and found that $SiO_2$- and MgO-supported $Ga_2O_3$ catalysts remained inactive while the rest of the supports showed propane conversions in the absence of $CO_2$ [B. Xu, B. Zheng, W. Hua, Y. Yue, Z. Gao, Support effect in the dehydrogenation of propane in the presence of $CO_2$ over supported gallium oxide catalysts J. Catal. 239 (2006) 470-477]. The addition of $CO_2$ may also promote the catalytic activities of $Ga_2O_3/Al_2O_3$, $Ga_2O_3/TiO_2$, and $Ga_2O_3/ZrO_2$ catalysts. The interplay of acid-base properties and the interaction between the metal and support was observed to exert an influence on propane conversions.

Although a few catalysts have been developed in the past, there still exists a need to develop a catalyst for oxidative dehydrogenation of propane to produce propylene that simultaneously harnesses the advantages of the two classes of catalysts and circumvents their individual limitations with high selectivity, in high yields.

In view of the foregoing, it is one objective of the present disclosure to provide a method for producing propylene ($C_3H_8$) via oxidative dehydrogenation (ODH) of propane. A second objective of the present disclosure is to provide a method of making a $Ga_2O_3/La_2O_3$—$\gamma$—$Al_2O_3$ catalyst.

SUMMARY

In an exemplary embodiment, a method for producing propylene ($C_3H_8$) via oxidative dehydrogenation (ODH) of propane, is described. The method includes introducing a propane-containing feed gas stream into a reactor containing an alumina-supported $Ga_2O_3/La_2O_3$ catalyst containing $Ga_2O_3$ particles at least partially disposed on surfaces of a matrix containing rough and irregular-sized $La_2O_3$ and alumina particles. The method includes passing the propane-containing feed gas stream through the reactor in contact with the alumina supported $Ga_2O_3/La_2O_3$ catalyst at a temperature of 500 to 600° C. to convert at least a portion of the propane to propylene ($C_3H_6$) and produce a propylene-containing gas stream leaving the reactor. The method further includes separating the propylene from the propylene-containing gas stream. In some embodiments, the method has a propane conversion of up to 95% based on an initial weight of the propane in the propane-containing feed gas stream. In some embodiments, the method has a propylene yield of up to 60% based on the propane conversion.

In some embodiments, the $C_3H_8$ is present in the propane-containing feed gas stream at a concentration of 20 to 99 vol. % based on a total volume of the propane-containing feed gas stream. In some embodiments, the propane-containing feed gas stream further comprises carbon dioxide ($CO_2$). In some embodiments, a volume ratio of $C_3H_8$ to $CO_2$ present in the propane-containing feed gas stream is in a range of 1:1 to 1:4.

In some embodiments, the reactor is at least one selected from the group consisting of a fixed-bed reactor, a trickle-bed reactor, a moving bed reactor, a rotating bed reactor, a fluidized bed reactor, and a slurry reactor.

In some embodiments, the reactor is a fixed-bed reactor in the form of a cylindrical reactor comprising a top portion; a cylindrical body portion; a bottom portion; a housing having an open top and open bottom supportably maintained with the cylindrical body portion. In some embodiments, the alumina supported $Ga_2O_3/La_2O_3$ catalyst is supportably retained within the housing permitting fluid flow therethrough. The fixed-bed reactor further includes at least one propeller agitator is disposed in the bottom portion of the reactor. In some embodiments, the bottom portion is cone shaped or pyramidal. In some embodiments, a plurality of recirculation tubes fluidly connects the bottom portion of the cylindrical reactor with the cylindrical body portion of the cylindrical reactor.

In some embodiments, the alumina-supported $Ga_2O_3/La_2O_3$ catalyst is at least one of a gamma-alumina supported $Ga_2O_3/La_2O_3$ catalyst ($Ga_2O_3/La_2O_3$-$\gamma$-$Al_2O_3$), an alpha-alumina supported $Ga_2O_3/La_2O_3$ catalyst ($Ga_2O_3/La_2O_3$-$\alpha$-$Al_2O_3$), and a delta-alumina supported $Ga_2O_3/La_2O_3$ catalyst ($Ga_2O_3/La_2O_3$-$\delta$-$Al_2O_3$).

In some embodiments, the alumina-supported $Ga_2O_3/La_2O_3$ catalyst is $Ga_2O_3/La_2O_3$-$\gamma$-$Al_2O_3$ catalyst having a mesoporous structure. In some embodiments, the $Ga_2O_3$ particles of the $Ga_2O_3/La_2O_3$-$\gamma$-$Al_2O_3$ catalyst form a layer disposed on surfaces of the matrix containing rough and irregular sized $La_2O_3$ and $\gamma$-$Al_2O_3$ particles.

In some embodiments, the alumina-supported $Ga_2O_3/La_2O_3$ catalyst contains particles having a micropore area in a range of 2 to 20 square meters per gram ($m^2/g$).

In some embodiments, the alumina-supported $Ga_2O_3/La_2O_3$ catalyst contains particles having a specific surface area in a range of 30 to 150 square meters per gram ($m^2/g$).

In some embodiments, the alumina-supported $Ga_2O_3/La_2O_3$ catalyst contains particles having a total pore volume in a range of 0.1 to 0.3 cubic centimeters per gram ($cm^3/g$).

In some embodiments, the alumina-supported $Ga_2O_3/La_2O_3$ catalyst contains particles having an average pore diameter in a range of 5 to 15 nanometers (nm).

In some embodiments, the alumina supported $Ga_2O_3/La_2O_3$ catalyst has an ammonia temperature-programmed desorption ($NH_3$-TPD) of 0.35 to 0.5 millimoles per gram (mmol/g).

In some embodiments, the propylene-containing gas stream leaving the reactor further contains ethylene, methane, ethane, propane, carbon monoxide, and carbon dioxide.

In some embodiments, the method further includes preparing the $Ga_2O_3/La_2O_3$—$\gamma$—$Al_2O_3$ catalyst by mixing an aluminum salt and a lanthanum salt in water to form a first mixture; adjusting a pH of the first mixture to 8.5 by adding an ammonium salt; heating the first mixture after adjusting the pH to precipitate a precursor composite from the first mixture; separating the precursor composite from the first mixture and calcining the precursor composite at a temperature of about 500° C. to form a $La_2O_3$-$\gamma$-$Al_2O_3$ support. In some embodiments, the $La_2O_3$—$\gamma$—$Al_2O_3$ support contains rough and irregular-sized $La_2O_3$ and $\gamma$-$Al_2O_3$ particles. In some embodiments, the $\gamma$-$Al_2O_3$ particles have a particle size in a range of 1 to 150 micrometers ($\mu$m). The preparing of the $Ga_2O_3$/$La_2O_3$-$\gamma$-$Al_2O_3$ catalyst further includes mixing a gallium salt and the $La_2O_3$—$\gamma$—$Al_2O_3$ support in water to form a second mixture; and drying the second mixture and calcining the second mixture at a temperature of about 500° C. to deposit $Ga_2O_3$ particles on surfaces of the $La_2O_3$-$\gamma$-$Al_2O_3$ support thereby generating the $Ga_2O_3$/$La_2O_3$-$\gamma$-$Al_2O_3$. In some embodiments, the $Ga_2O_3$ particles present in the $Ga_2O_3$/$La_2O_3$-$\gamma$-$Al_2O_3$ are in the form of a layer having an average thickness of 50 to 1000 nm.

In some embodiments, a molar ratio of the $La_2O_3$ to the $\gamma$-$Al_2O_3$ present in the $La_2O_3$-$\gamma$-$Al_2O_3$ support is in a range of 1:1 to 1:3.

In some embodiments, the weight ratio of the gallium salt to the $La_2O_3$-$\gamma$-$Al_2O_3$ support is in a range of 1:5 to 1:15.

In some embodiments, the aluminum salt includes aluminum sulfate, aluminum nitrate, aluminum chloride, aluminum acetate, aluminum carbonate, aluminum phosphate, and/or a hydrate thereof.

In some embodiments, the lanthanum salt includes lanthanum sulfate, lanthanum nitrate, lanthanum chloride, lanthanum acetate, lanthanum carbonate, lanthanum phosphate, and/or a hydrate thereof.

In some embodiments, the gallium salt includes gallium sulfate, gallium nitrate, gallium chloride, gallium acetate, gallium carbonate, gallium phosphate, and/or a hydrate thereof.

In some embodiments, the ammonium salt includes ammonium carbonate, ammonium hydrogen carbonate, ammonium acetate, ammonium hydroxide, and/or a hydrate thereof.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2A is a schematic illustration depicting various stages for the preparation of catalyst support, according to certain embodiments;

FIG. 2B is a schematic illustration depicting various stages of gallium deposition on the catalyst support, according to certain embodiments;

DETAILED DESCRIPTION

Figure 1A:
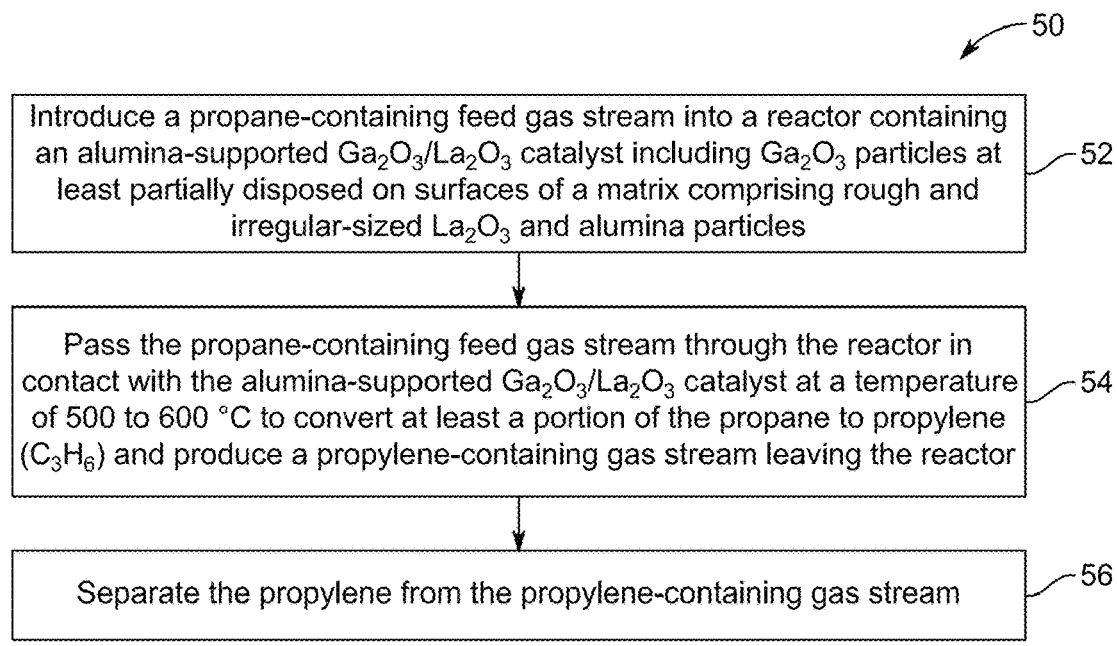
FIG. 1A is a flowchart depicting a method for producing propylene ($C_3H_8$) via oxidative dehydrogenation (ODH) of propane, according to certain embodiments.

In the drawings, reference numerals designate identical or corresponding parts throughout the several views. Further, as used herein, the words "a," "an," and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "conversion" generally refer to a transformation of one or more chemical substances into different chemical substances through a chemical reaction involving rearrangement of atoms and the exchange of energy. In the present disclosure, the terms "conversion," or "propane conversion" generally refer to the transformation of propane into chemicals including but not limited to propylene, ethylene, methane, ethane, carbon monoxide, carbon dioxide, a hydrocarbon containing $C_4$-$C_9$ such as butane, butene, pentane, and pentene; and aromatics such as benzene, naphthalene, anthracene, or their isomers, or mixtures of these substance. The "conversion," or "propane conversion" may be calculated based on an initial weight of the propane in the propane-containing feed gas stream.

As used herein, the term "yield" generally refer to the amount (e.g., as determined by weight) or quantity (numbers) of products produced in a chemical reaction. In the present disclosure, the terms "yield," or "propylene yield" generally refer to the actual amount of propylene obtains from the propane oxidative dehydrogenation (ODH) reaction based on the amount of propane converted (e.g., propane conversion).

The present disclosure is intended to include all hydration states of a given compound or formula, unless otherwise noted or when heating a material. As used herein, the hydration state of a compound generally refers to the number of water molecules that are chemically attached to each molecule of the compound.

Aspects of the present disclosure are directed to a method of making a $Ga_2O_3/La_2O_3$-γ$Al_2O_3$ composite catalyst, including preferably $Ga_2O_3/La_2O_3$-γ$Al_2O_3$ (1:1), preferably $Ga_2O_3/La_2O_3$-γ$Al_2O_3$ (2:1), and preferably $Ga_2O_3/La_2O_3$-γ$Al_2O_3$ (3:1), with varying percentage of $La_2O_3$ in the catalysts. The synthesized catalysts were evaluated for their potential to produce propylene ($C_3H_8$) via oxidative dehydrogenation (ODH) under a mild oxidative environment of $CO_2$.

FIG. 1A illustrates a flow chart of a method 50 of producing propylene ($C_3H_8$) via oxidative dehydrogenation (ODH) of propane as described herein. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 introducing a propane-containing feed gas stream into a reactor containing an alumina-supported $Ga_2O_3/La_2O_3$ catalyst including $Ga_2O_3$ particles at least partially disposed on surfaces of a matrix containing rough and irregular-sized $La_2O_3$ and alumina particles. In some embodiments, at least 10%, at least 30%, at least 50%, at least 70%, at least 90%, or at least 99% of a total surface area of the matrix containing rough and irregular-sized $La_2O_3$ and alumina particles is covered by the $Ga_2O_3$ particles. Other ranges are also possible.

In some embodiments, the propane-containing gas stream includes propane ($C_3H_8$). In an embodiment, the $C_3H_8$ is present in the propane-containing feed gas stream at a concentration of 10 to 99 vol. % based on a total volume of the propane-containing feed gas stream, preferably 20 to 99 vo. %, preferably 40 to 99 vol. %, preferably 60 to 99 vol. %, or even more preferably 80 to 99 vol. % based on the total volume of the propane-containing feed gas stream. Optionally, it may include other gases like carbon dioxide ($CO_2$), nitrogen ($N_2$), oxygen ($O_2$), helium (He), and argon (Ar) etc. In a preferred embodiment, the propane-containing gas stream includes propane and $CO_2$. In some embodiments, the $C_3H_8$ and $CO_2$ are present in the propane-containing feed gas stream at a concentration of 10 to 99 vol. %, preferably 20 to 99 vol. %, preferably 40 to 99 vol. %, preferably 60 to 99 vol. %, or even more preferably 80 to 99 vol. % based on the total volume of the propane-containing feed gas stream. In some further embodiments, a volume ratio of $C_3H_8$ to $CO_2$ present in the propane-containing feed gas stream is in the range of about 20:1 to 1:20, preferably about 10:1 to 1:16, preferably about 5:1 to 1:12, preferably about 1:1 to 1:8, preferably about 1:1 to 1:4, or even more preferably about 1:1 to 1:2. Other ranges are also possible.

The propane-containing gas stream is fed into the reactor. The reactor is at least one of a fixed-bed reactor, a trickle-bed reactor, a moving bed reactor, a rotating bed reactor, a fluidized bed reactor, and a slurry reactor. In a preferred embodiment, the reactor is a fixed-bed reactor. The fixed bed reactor is in the form of a cylindrical reactor, including a top portion; a cylindrical body portion; a bottom portion; a housing having an open top and open bottom supportably maintained with the cylindrical body portion. The alumina-supported $Ga_2O_3/La_2O_3$ catalyst is supportably retained within the housing, permitting fluid flow there through. The reactor further includes at least one propeller agitator that is disposed in the bottom portion of the reactor. In some embodiments, the main function of the propeller agitator is homogenization, dispersion, and suspension of low-viscosity products. In some embodiments, the bottom portion is cone-shaped or pyramidal and preferably accommodates the propeller agitator. In an embodiment, the bottom portion may have a cylindrical, cubical, cuboidal, or rhombic shape. In some preferred embodiments, a plurality of recirculation tubes fluidly connects the bottom portion of the cylindrical reactor with the cylindrical body portion of the cylindrical reactor. The recirculation tubes are preferably connected to the bottom portion of the cylindrical reactor at a position below the position of the propeller agitator but no closer than 15% of the total height of the bottom portion of the cylindrical reactor to a bottommost point of the cylindrical reactor. The recirculation tubes are preferably arranged symmetrically around the circumference of the cylindrical reactor and fluidly connect with a body portion of the cylindrical reactor above the agitator propeller and no more than mid-way high on the cylindrical reactor. The recirculation tubes preferably have an inside diameter of 0.05-0.2 time the diameter of the widest internal dimension of the cylindrical reactor. In an embodiment, the fixed-bed reactor may be made up of a material such as stainless-steel, iron, aluminum, copper, lead, iron, zirconium, or another alloy.

The alumina-supported $Ga_2O_3/La_2O_3$ catalyst includes alumina in a plurality of different crystallographic phases—for example: aluminum oxide, alumina, alumina monohydrate, alumina trihydrate, alumina-silica, bauxite, calcined aluminum hydroxides such as gibbsite, bayerite and boehmite, α-alumina, transition alumina such as γ-alumina, η-alumina and δ-alumina, and calcined hydrotalcite. In some embodiments, the alumina-support is γ-alumina-based ($\gamma$-$Al_2O_3$). In some embodiments, the alumina-supported $Ga_2O_3/La_2O_3$ catalyst is at least one of a gamma-alumina supported $Ga_2O_3/La_2O_3$ catalyst ($Ga_2O_3/La_2O_3$-$\gamma$-$Al_2O_3$), an alpha-alumina supported $Ga_2O_3/La_2O_3$ catalyst ($Ga_2O_3/La_2O_3$-$\alpha$-$Al_2O_3$), and a delta-alumina supported $Ga_2O_3/La_2O_3$ catalyst ($Ga_2O_3/La_2O_3$-$\delta$-$Al_2O_3$).

Figure 5A:
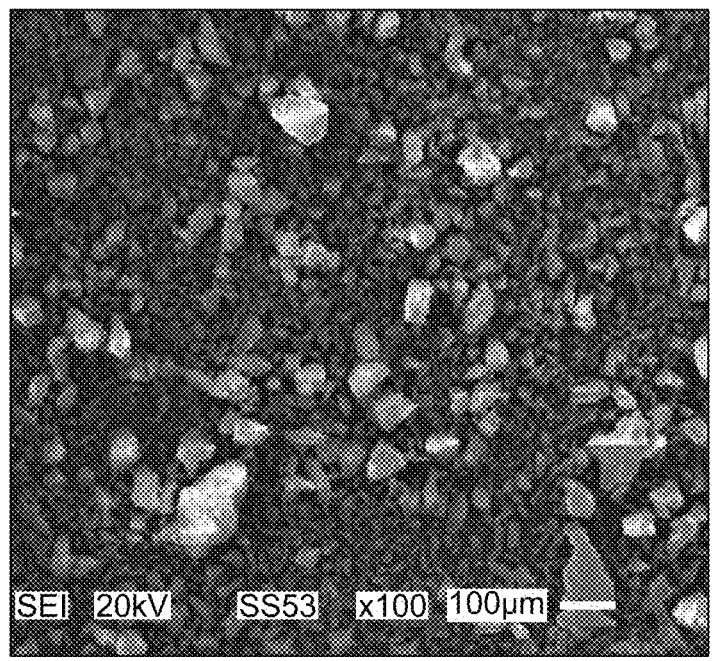
FIG. 5A is a scanning electron micrograph (SEM) of $\gamma$-$Al_2O_3$ according to certain embodiments.
Figure 5B:
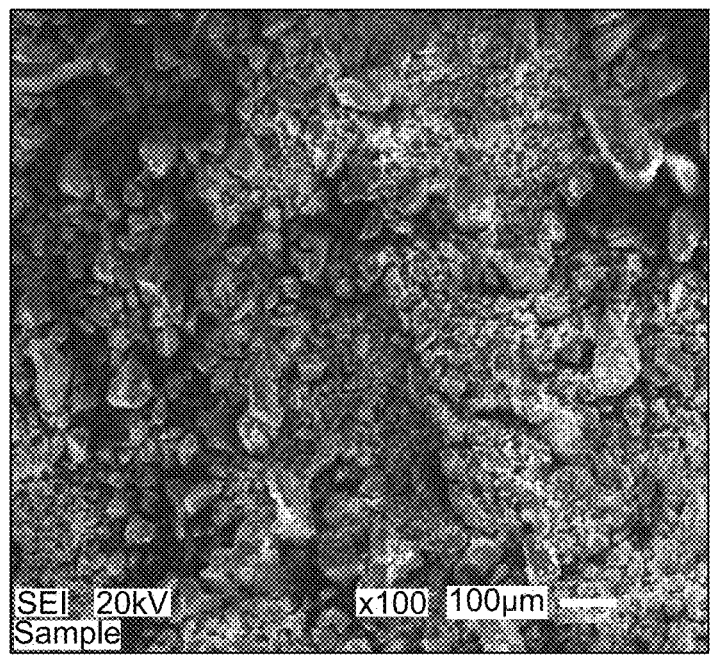
FIG. 5B shows an SEM image of $Ga_2O_3$/$\gamma$-$Al_2O_3$, according to certain embodiments.
Figure 5C:
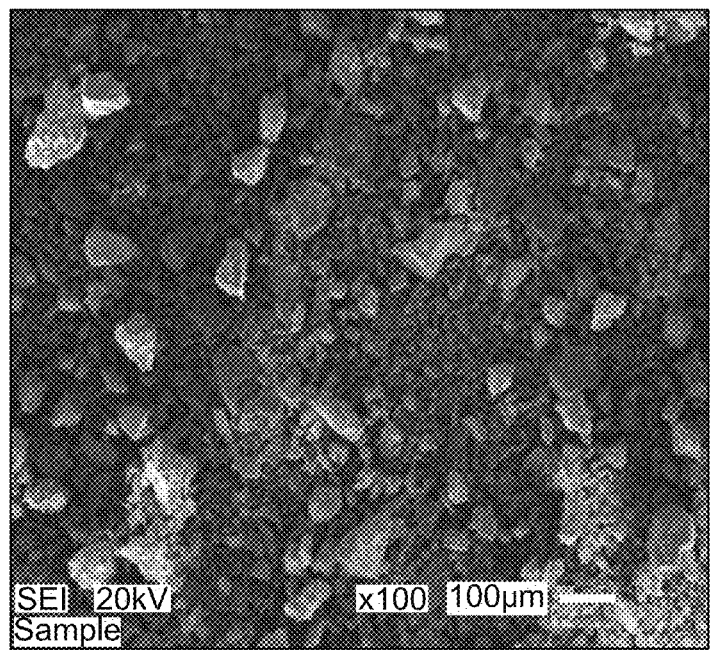
FIG. 5C shows an SEM image of $Ga_2O_3$/$La_2O_3$-$\gamma$-$Al_2O_3$ (1:2), according to certain embodiments.
Figure 5D:
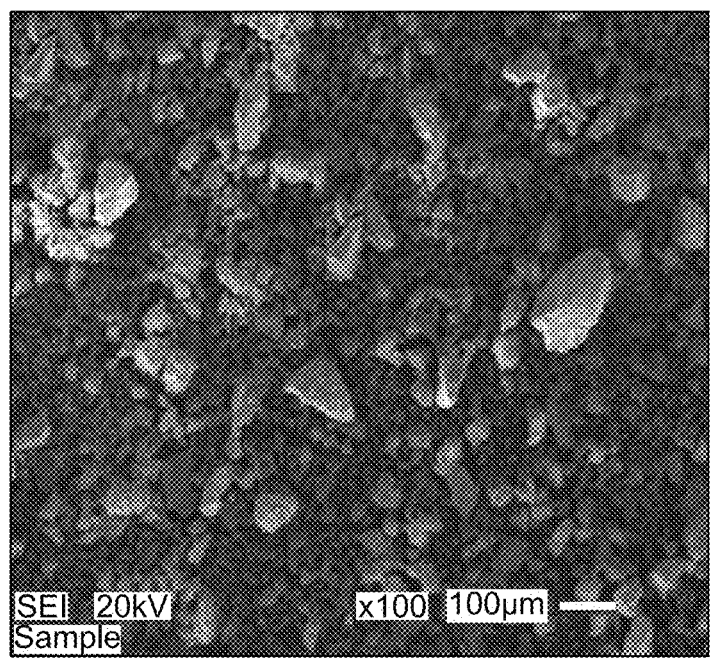
FIG. 5D shows an SEM image of $Ga_2O_3$/$La_2O_3$-$\gamma$-$Al_2O_3$ (1:1), according to certain embodiments.
Figure 5F:
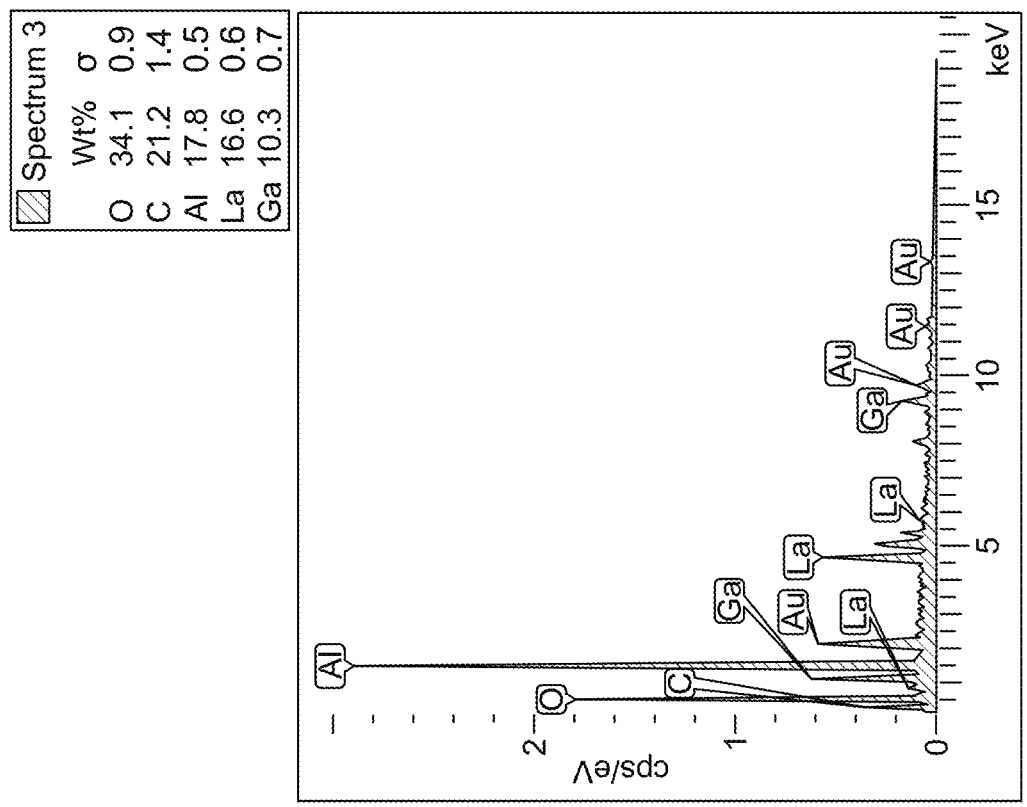
FIG. 5F shows an EDX image of $Ga_2O_3$/$La_2O_3$-$\gamma$-$Al_2O_3$ (1:1), according to certain embodiments.
Figure 5E:
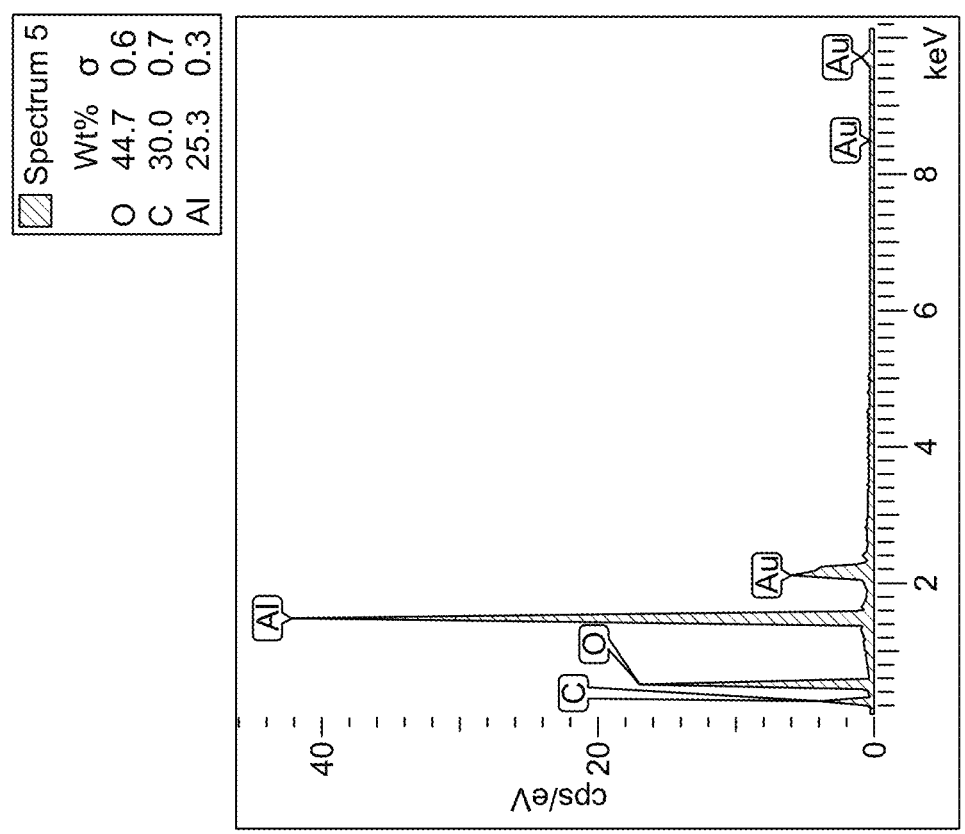
FIG. 5E shows an Energy Dispersive X-ray spectroscopic (EDX) image of $\gamma$-$Al_2O_3$, according to certain embodiments.

In some embodiments, the alumina support has an average particle size of 5 to 100 μm, preferably 10 to 80 μm, preferably 15 to 60 μm, or even more preferably 20 to 40 μm, as depicted in FIG. 5A. Other ranges are also possible. In a preferred embodiment, the alumina support is-alumina-based ($\gamma$-$Al_2O_3$). In some embodiments, the $\gamma$-$Al_2O_3$ has an excellent surface area owing to the small particle size, which results in the high activity of the surface for catalyst support. Optionally, other support materials, such as silica, silica gel, alumina, titania, silica/alumina, calcium metasilicate, pyrogenic silica, high purity silica, zirconia, carbon, zeolites, and mixtures thereof, can be used as support materials as well (albeit with a few variations, as may be obvious to a person skilled in the art). In some embodiments, the support may be impregnated with promoters. Suitable examples of the promoters include one or more transition metals, one or more transition metal-containing compounds, alkali metals, alkali-metal-containing compounds, or combinations thereof.

The alumina support may be procured commercially. In an exemplary process of making the alumina support, the alumina support is immersed in an aqueous solution (preferably water) or any other liquid to form a paste-like substance. The paste is further heated to a rate of 10° C./min, preferably about 5° C./min, and more preferably about 3° C./min up to 180° C., preferably up to 160° C., preferably up to 140° C., or even more preferably up to 120° C. Other ranges are also possible. Heating to such temperature results in the evaporation of water molecules from the alumina support; it may also alter its pore structure. The support is further dried to a temperature range of 100-140° C., preferably to about 120° C., to obtain the alumina support. The alumina support thus obtained can be used to prepare the catalyst composition. In a preferred embodiment, the alumina support is amorphous. In certain embodiments, the alumina support may be prepared by other methods conventionally known in the art. The alumina support may be porous or non-porous. In some embodiments, the $\gamma$-$Al_2O_3$ has a closely packed hexagonal structure in which aluminum and oxygen atoms are arranged in a regular pattern. In some further embodiments, the aluminum atoms are located at the centers of octahedra, and the oxygen atoms occupy tetrahedral and octahedral sites in a way that creates a distorted hexagonal close-packed arrangement. In some preferred embodiments, the alumina support has a specific surface area of up to 200 $m^2/g$, more preferably up to 100 $m^2/g$. In some further preferred embodiments, the alumina support has a pore volume in a range of 0.1 to 1.0 $cm^3/g$, preferably 0.2 to 0.8 $cm^3/g$, or even more preferably 0.3 to 0.6 $cm^3/g$. Other ranges are also possible.

In some embodiments, the alumina-supported $Ga_2O_3/La_2O_3$ catalyst is $Ga_2O_3/La_2O_3$-$\gamma$-$Al_2O_3$ catalyst having a mesoporous structure. In some embodiments, the $Ga_2O_3$ particles of the $Ga_2O_3/La_2O_3$-$\gamma$-$Al_2O_3$ catalyst form a layer disposed on surfaces of the matrix, including rough and irregular-sized $La_2O_3$ and $\gamma$-$Al_2O_3$ particles.

As used herein, the term "$N_2$ adsorption/desorption method" generally refers to a technique used to measure the specific surface area of a solid material, such as an adsorbent material or a porous material. In some embodiments, the alumina-supported $Ga_2O_3/La_2O_3$ catalyst is exposed to a stream of nitrogen gas at low temperature and pressure. The nitrogen gas is adsorbed onto the surface of the alumina-supported $Ga_2O_3/La_2O_3$ catalyst, filling the pores and creating a monolayer of adsorbed nitrogen. In some further embodiments, the amount of nitrogen adsorbed at a given pressure is measured using a gas adsorption instrument, such as a Micromeritic model ASAP analyzer. In some preferred embodiments, the BET analysis is performed on the Micromeritic model ASAP analyzer according to the software manual. In some more preferred embodiments, the nitrogen gas is gradually removed from the alumina-supported $Ga_2O_3/La_2O_3$ catalyst, causing the desorption of the adsorbed nitrogen. The amount of nitrogen desorbed at a given pressure is also measured using the gas adsorption instrument. By analyzing the amount of nitrogen adsorbed and desorbed, the specific surface area of the alumina-supported $Ga_2O_3/La_2O_3$ catalyst can be calculated using the BJH (Brunauer-Emmett-Teller) and Barrett, Joyner and Halenda (BJH) equation.

Figure 6A:
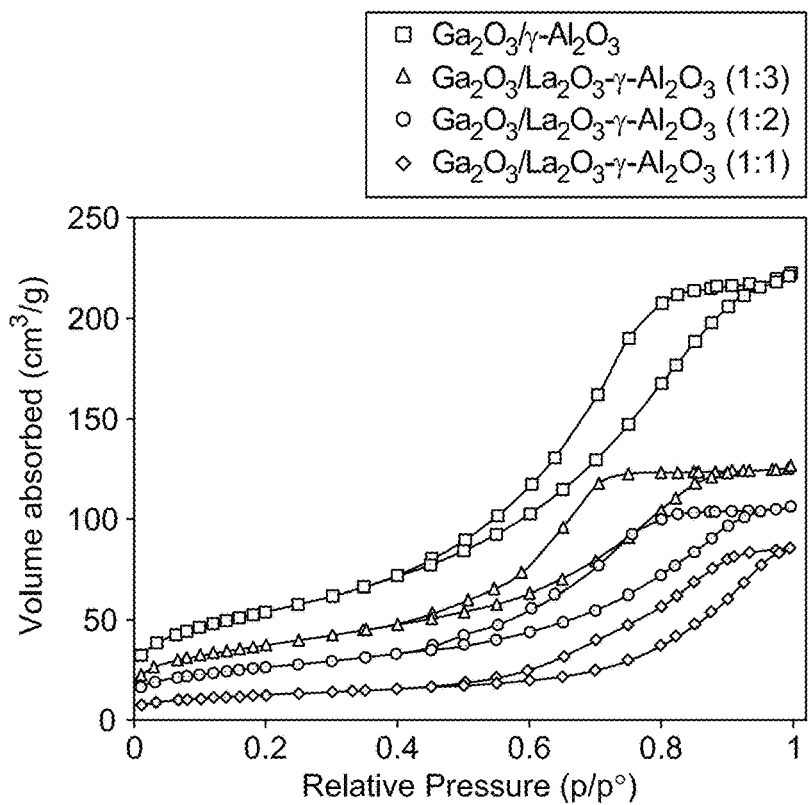
FIG. 6A shows $N_2$ adsorption isotherm curves for various catalysts, namely-fresh $\gamma$-$Al_2O_3$, $Ga_2O_3$/$\gamma$-$Al_2O_3$, $Ga_2O_3$/$La_2O_3$-$\gamma$-$Al_2O_3$ (1:3), $Ga_2O_3$/$La_2O_3$-$\gamma$-$Al_2O_3$ (1:2), and $Ga_2O_3$/$La_2O_3$-$\gamma$-$Al_2O_3$ (1:1), according to certain embodiments.
Figure 6B:
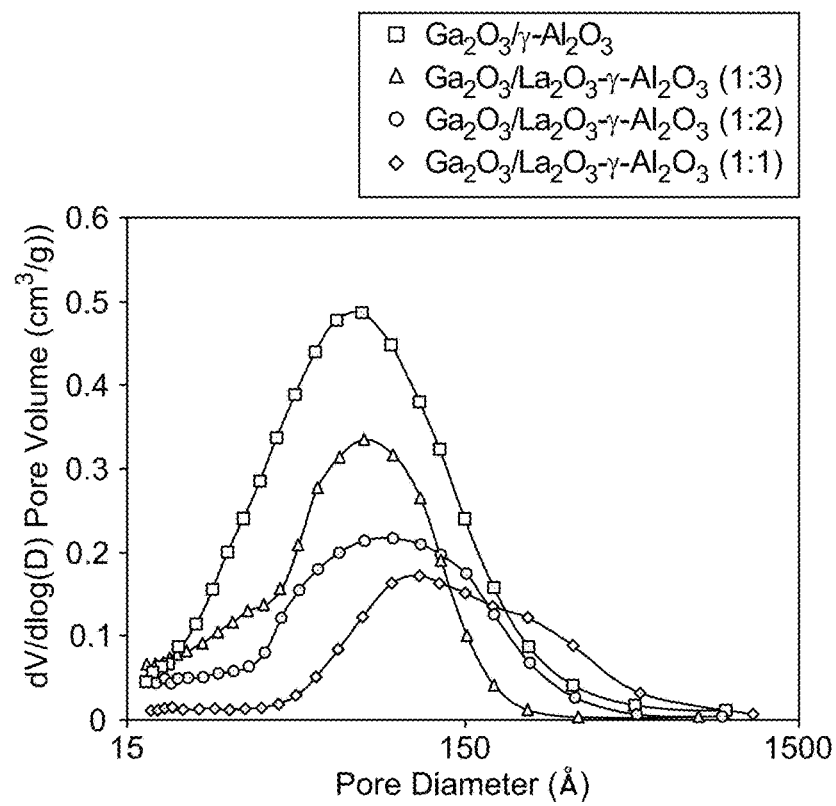
FIG. 6B shows pore size distribution (PSD) curves for various catalysts, namely-fresh $\gamma$-$Al_2O_3$, $Ga_2O_3$/$\gamma$-$Al_2O_3$, $Ga_2O_3$/$La_2O_3$-$\gamma$-$Al_2O_3$ (1:3), $Ga_2O_3$/$La_2O_3$—$\gamma$—$Al_2O_3$ (1:2), and $Ga_2O_3$/$La_2O_3$-$\gamma$-$Al_2O_3$ (1:1), according to certain embodiments.

In some embodiments, the alumina-supported $Ga_2O_3/La_2O_3$ catalyst has particles having a micropore area in a range of 1 to 30 square meters per gram ($m^2/g$), preferably 2 to 20 $m^2/g$, preferably 3-19 $m^2/g$, preferably 3.5 to 15 $m^2/g$, preferably 4-14 $m^2/g$, or even more preferably 4.5-13.5 $m^2/g$. In some embodiments, the alumina-supported $Ga_2O_3/La_2O_3$ catalyst has a specific surface area in a range of 10 to 250 square meter per gram ($m^2/g$), preferably 30 to 150 $m^2/g$, preferably 35 to 140 $m^2/g$, preferably 40 to 135 $m^2/g$, or even more preferably 41 to 132 $m^2/g$, as depicted in FIG. 6A. In some embodiments, the alumina-supported $Ga_2O_3/La_2O_3$ catalyst has a total pore volume in a range of 0.05 to 0.5 cubic centimeter per gram ($cm^3/g$), preferably 0.1 to 0.3 $cm^3/g$, or even more preferably 0.1 to 0.2 $cm^3/g$, as depicted in FIG. 6B. In some embodiments, the alumina-supported $Ga_2O_3/La_2O_3$ catalyst has an average pore diameter in a range of 1 to 25 nanometers (nm), preferably 5 to 15 nm, preferably 6-14 nm, preferably 7-13 nm, preferably 7.5 to 12.1 nm, as depicted in FIG. 6B.

As used herein, the term "temperature program desorption using ammonia," or "$NH_3$-TPD" generally refers to a technique used to study the surface acidity of a solid material, such as the alumina-supported $Ga_2O_3/La_2O_3$ catalyst. In some embodiments, the alumina-supported $Ga_2O_3/La_2O_3$ catalyst is first heated in an inert gas, such as nitrogen, to remove any adsorbed species and to stabilize the surface. In some embodiments, the alumina-supported $Ga_2O_3/La_2O_3$ catalyst is then cooled down and exposed to a stream of ammonia gas, which is adsorbed onto the surface of the adsorbent material. The amount of ammonia adsorbed is proportional to the surface basicity of the alumina-supported $Ga_2O_3/La_2O_3$ catalyst. In some embodiments, the alumina-supported $Ga_2O_3/La_2O_3$ catalyst is then heated at a constant rate while the amount of ammonia desorbed is monitored as a function of temperature. In some further embodiments, ss the temperature increases, the adsorbed ammonia begins to desorb from the surface of the alumina-supported $Ga_2O_3/La_2O_3$ catalyst. In some preferred embodiments, the desorption of ammonia may be exothermic, and the heat generated by the desorption process is monitored using a thermal conductivity detector.

The alumina-supported $Ga_2O_3/La_2O_3$ catalyst was characterized mainly using $NH_3$-TPD. Temperature programmed desorption (TPD) is a technique used to monitor surface interactions between molecular species on a surface when the surface temperature has changed in a controlled setting. This is done by placing the alumina-supported $Ga_2O_3/La_2O_3$ catalyst inside a reactor and pushing an inert gas into the chamber. Alternatively, the sample can be located in an ultra-high vacuum (UHV) chamber with no carrier gas. The sample is dosed with a probe gas such as CO, $NH_3$, $H_2$, etc. The sample is then increased in temperature at a linear ramp rate, and the desorption products are analyzed by a mass spectrometer.

The $NH_3$-TPD may be conducted on an Autochem II 2920 chemisorption analyzer. The alumina-supported $Ga_2O_3/La_2O_3$ catalyst was heated at a temperature of 100 to 800° C., preferably about 100 to 750° C. under a gas flow of helium and hydrogen for 30 to 180 min, preferably about 120 min at a flow rate of 30 to 70 milliliters per minute (mL/min), preferably 50 mL/min. Other ranges are also possible. In some further embodiments, the alumina-supported $Ga_2O_3/La_2O_3$ catalyst was then cooled to less than 300° C., preferably less than 250° C. before contacting with a $NH_3$-containing gas mixture. In some preferred embodiments, $NH_3$ is present in the gas mixture at a concentration of 1 to 20%, preferably about 5 to 15%, or even more preferably about 10% by volume. In some more preferred embodiments, the Autochem II 2920 chemisorption analyzer containing the alumina-supported $Ga_2O_3/La_2O_3$ catalyst is heated to a temperature of 600 to 900° C., preferably about 750° C. at a heating rate of 5 to 30° C./min, preferably 5 to 20° C./min, or even more preferably about 10° C./min. Other ranges are also possible.

Figure 7:
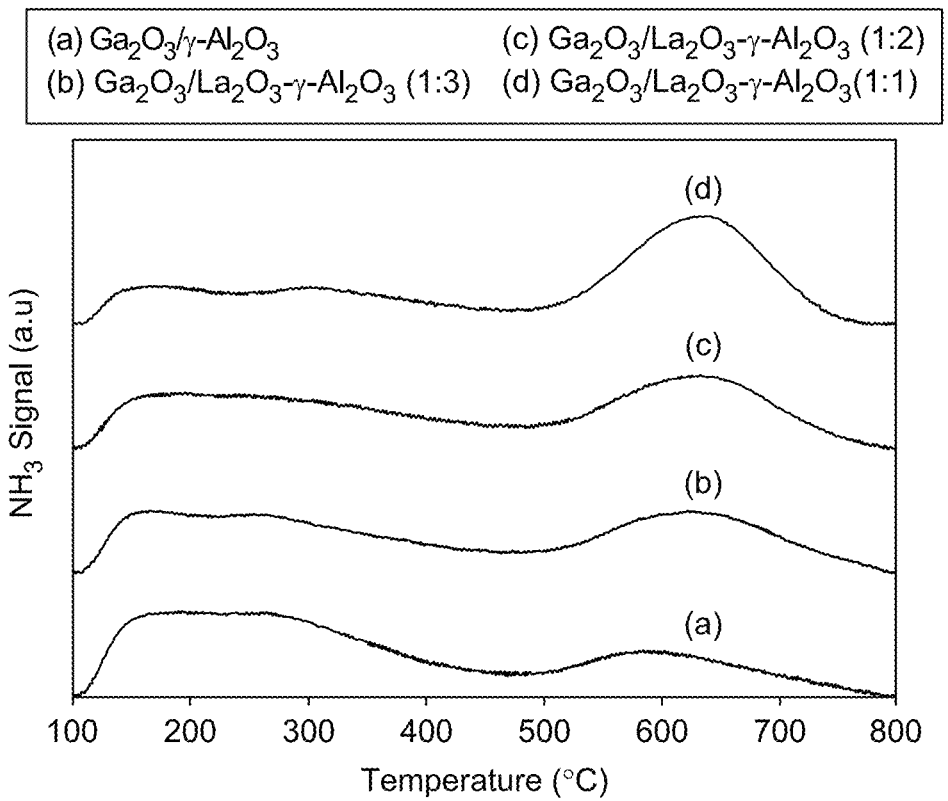
FIG. 7 shows an ammonia temperature programmed reduction ($H_2$-TPR) profile of $Ga_2O_3$/$\gamma$-$Al_2O_3$, $Ga_2O_3$/$La_2O_3$-$\gamma$-$Al_2O_3$ (1:3), $Ga_2O_3$/$La_2O_3$-$\gamma$-$Al_2O_3$ (1:2), and $Ga_2O_3$/$La_2O_3$-$\gamma$-$Al_2O_3$ (1:1), according to certain embodiments.

In some embodiments, the alumina-supported $Ga_2O_3/La_2O_3$ catalyst has an ammonia temperature-programmed desorption ($NH_3$-TPD) of 0.1 to 1 millimoles per gram (mmol/g), preferably 0.35 to 0.5 mmol/g, or even more preferably 0.4 to 0.45 mmol/g, as depicted in FIG. 7. Other ranges are also possible.

As used herein, the term "temperature program reduction using $H_2$," or "$H_2$-TPR", generally refers to a technique used to study the reducibility of a solid material, such as an alumina-supported $Ga_2O_3/La_2O_3$ catalyst, by measuring the consumption of a reducing gas, such as hydrogen, as a function of temperature. In some embodiments, the alumina-supported $Ga_2O_3/La_2O_3$ catalyst is first heated in an oxidizing gas, such as air or oxygen, to remove any adsorbed species and to convert the active catalyst composition to an oxide. In some further embodiments, the alumina-supported $Ga_2O_3/La_2O_3$ catalyst is then cooled down and exposed to a stream of hydrogen gas, while the temperature is gradually increased. As the temperature increases, the hydrogen reacts with the oxidized active catalyst composition, causing a reduction of the material. In some preferred embodiments, this reduction reaction may be exothermic, and the heat generated by the reaction is monitored as a function of temperature.

Figure 8:
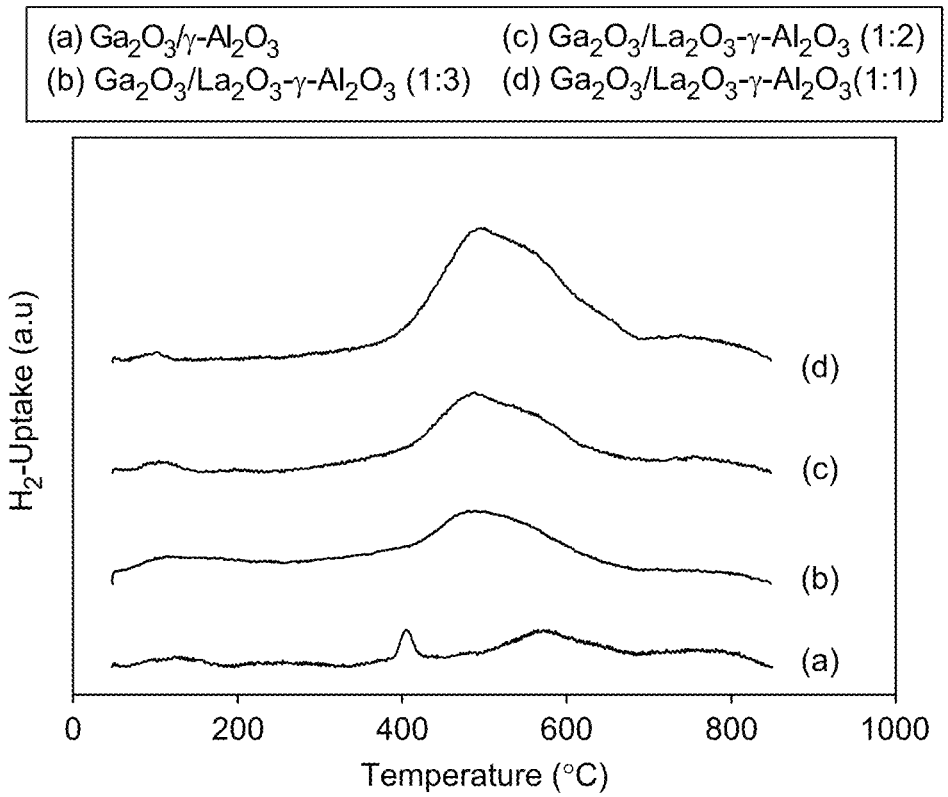
FIG. 8 shows a hydrogen temperature programmed reduction ($H_2$-TPR) profile of $Ga_2O_3$/$\gamma$-$Al_2O_3$, $Ga_2O_3$/$La_2O_3$-$\gamma$-$Al_2O_3$ (1:3), $Ga_2O_3$/$La_2O_3$-$\gamma$-$Al_2O_3$ (1:2), and $Ga_2O_3$/$La_2O_3$-$\gamma$-$Al_2O_3$ (1:1), according to certain embodiments.

Referring to FIG. 8, hydrogen-temperature programmed reduction ($H_2$-TPR) plots of the alumina-supported $Ga_2O_3/La_2O_3$ catalysts. In some embodiments, the $H_2$-TPR was conducted on a Micromeritics AutoChem-II 2920 unit equipped with a TCD detector. The alumina-supported $Ga_2O_3/La_2O_3$ catalyst was placed in a quartz calcined at a temperature of 200 to 400° C., preferably 225 to 375° C., preferably 250 to 350° C., preferably 275 to 325° C., or even more preferably about 300° C. under an argon flow for at least 60 minutes, at least 120 minutes, at least 180 minutes. In some further embodiments, the alumina-supported $Ga_2O_3/La_2O_3$ catalyst was cooled to a temperature of no more than 70° C., preferably no more than 60° C., or even more preferably no more than 50° C. In some preferred embodiments, a gas flow contains hydrogen ($H_2$) and argon (Ar) in a volumetric ratio of $H_2$ to Ar ranging from 1:20 to 1:1, preferably 1:15 to 1:5, or even more preferably about 1:10 was introduced to flow over the active catalyst composition at a flow rate of 10 to 100 cubic centimeters per minutes ($cm^3$/min), preferably 30 to 70 $cm^3$/min, or even more preferably about 50 $cm^3$/min. In some preferred embodiments, the temperature of the analyzer containing the active catalyst was increased at ramping rate of 5 to 20° C. per minute until the temperature reaches about 900° C. Other ranges are also possible. In some embodiments, $H_2$-TPR of the alumina-supported $Ga_2O_3/La_2O_3$ catalyst is about 0.01 to 1 mmol/g, preferably about 0.05 to 0.8 mmol/g, preferably 0.1 to 0.5 mmol/g, preferably 0.2 to 0.4 mmol/g, or even more preferably about 0.3 mmol/g, as depicted in FIG. 8. Other ranges are also possible.

At step 54, the method 50 includes passing the propane-containing feed gas stream through the reactor in contact with the alumina-supported $Ga_2O_3/La_2O_3$ catalyst at a temperature of 500 to 600° C. to convert at least a portion of the propane to propylene ($C_3H_6$) and produce a propylene-containing gas stream leaving the reactor. The pressure is maintained between 0.01 atm to 20 atmospheres. The conversion may be facilitated using UV, visible, or infrared light to promote the dehydrogenation reaction. The alumina-supported $Ga_2O_3/La_2O_3$ catalyst converts at least a portion of propane to propylene. On passing the propane-containing gas feed stream into the reactor, at least 50%, preferably 60%, preferably 70%, preferably 80%, preferably 90%, preferably 92%, preferably 94%, preferably 95% of the initial weight of the propane is converted based on an initial weight of the propane in the propane-containing feed gas stream. The propylene-containing gas stream leaving the reactor includes ethylene, methane, ethane, propane, carbon monoxide, carbon dioxide, a hydrocarbon containing $C_4$-$C_9$ such as butane, butene, pentane, and pentene; and aromatics such as benzene, naphthalene, anthracene, or their isomers, or mixtures of these substance. In some embodiments, the $C_4$-$C_9$ hydrocarbon contains butane, butene, butyne, pentane, pentene, pentyne, hexane, hexene, hexyne, cyclohexane, cyclohexene, heptane, heptene, heptyne, octane, octene, octyne, nonane, nonene, nonyne, or their isomers, or mixtures of these substance.

At step 56, the method 50 includes separating the propylene from the propylene-containing gas stream. The unreacted propane (exiting from the propylene-containing gas stream) may be fed back into the reactor through the inlet for the ODH process. The propylene may be separated from the propylene-containing gas stream by distillation, or any other separation techniques known in the art. In some embodiments, after removing propylene from the propylene-containing gas stream, the other gases may be fed back into the reactor for further re-use.

Figure 1B:
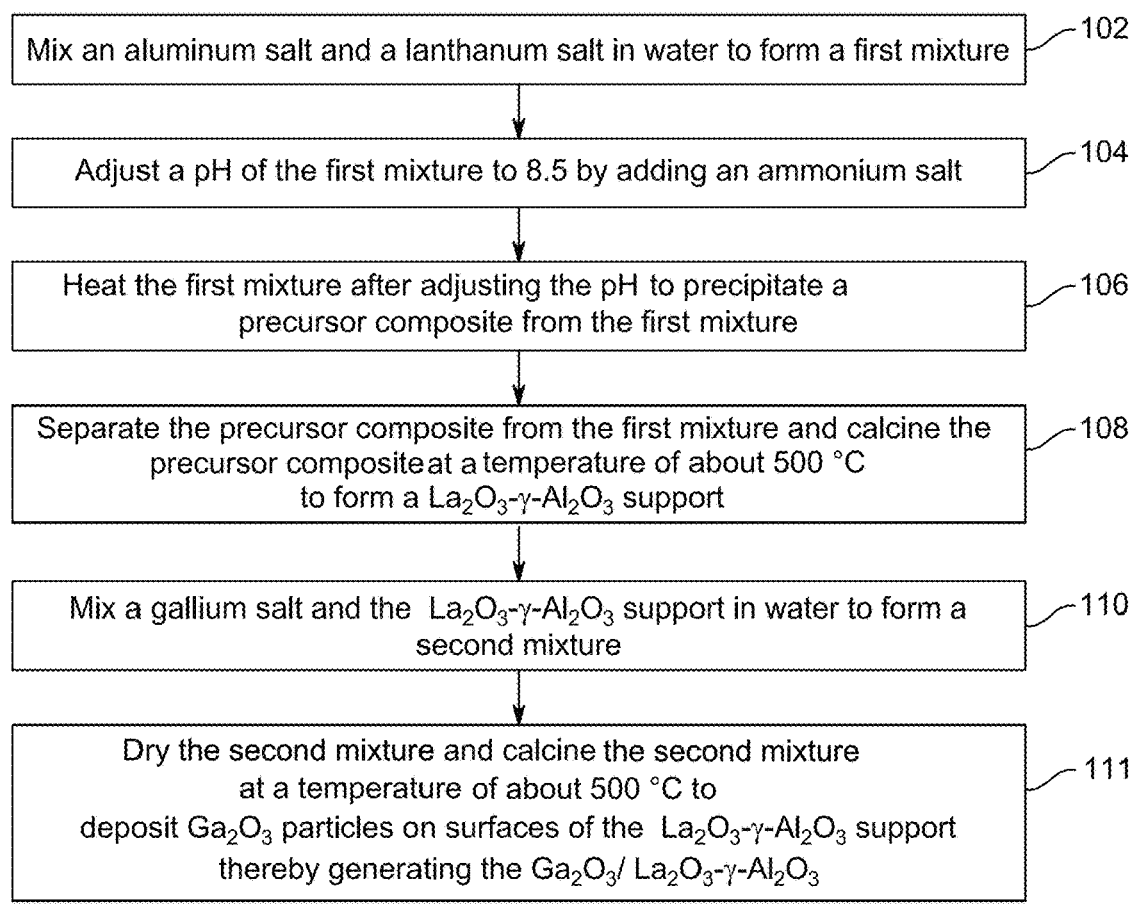
FIG. 1B is a flowchart depicting a method for making a $Ga_2O_3$/$La_2O_3$-$\gamma$-$Al_2O_3$ catalyst, according to certain embodiments.

FIG. 1B illustrates a flow chart of a method 100 of preparing the $Ga_2O_3/La_2O_3$—γ—$Al_2O_3$ catalyst as described herein. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing an aluminum salt and a lanthanum salt in water to form a first mixture. In some embodiments, the lanthanum salt includes lanthanum sulfate, lanthanum nitrate, lanthanum chloride, lanthanum acetate, lanthanum carbonate, lanthanum phosphate, and/or a hydrate thereof. In some embodiments, the aluminum salt includes aluminum sulfate, aluminum nitrate, aluminum chloride, aluminum acetate, aluminum carbonate, aluminum phosphate, and/or a hydrate thereof. In a preferred embodiment, the lanthanum salt is lanthanum nitrate, and the aluminum salt is aluminum nitrate. In some embodiments, a mass ratio of lanthanum salt to aluminum salt present in the first mixture is in a ratio range of 1:20 to 20:1, preferably 1:10 to 10:1, preferably 1:5 to 5:1, preferably 1:1 to 1:5, or even more preferably 1:1 to 1:3. Other ranges are also possible.

At step 104, the method 100 includes adjusting a pH of the first mixture to 8.5 by adding an ammonium salt. In some embodiments, the ammonium salt includes ammonium carbonate, ammonium hydrogen carbonate, ammonium acetate, ammonium hydroxide, and/or a hydrate thereof. In a preferred embodiment, the ammonium salt is ammonium carbonate.

At step 106, the method 100 includes heating the first mixture after adjusting the pH to precipitate a precursor composite from the first mixture. In an embodiment, the pH is of the first mixture is adjusted to a range of 7-9, preferably 8-9, preferably 8.5, at a temperature range of 35-45° C., preferably 40° C. During this process, the first mixture is preferably, constantly stirred, using an agitator, like a stirrer, to increase the rate of precipitation.

At step 108, the method 100 includes separating the precursor composite from the first mixture and calcining the precursor composite at a temperature of about 300 to 100° C., preferably 400 to 800° C., or even more preferably about 500° C. to form a $La_2O_3$-γ-$Al_2O_3$ support. The precursor composite is separated from the first mixture by filtration. The precursor composite is calcined by subjecting the precursor composite by heating it to a high temperature, under a restricted supply of ambient oxygen. This was performed to remove impurities or volatile substances and to incur thermal decomposition. Typically, the calcination is carried out in a furnace preferably equipped with a temperature control system, which may provide a heating rate of up to 50° C./min, or preferably up to 40° C./min, or preferably up to 30° C./min, preferably up to 20° C./min, preferably up to 10° C./min, preferably up to 5° C./min. In some preferred embodiments, the precursor composite is heated with a heating rate in the range of 1 to 15° C./min, preferably 3 to 10° C./min, preferably 5 to 6° C./min to a temperature range of 500 to 700, preferably 500° C. for 1 to 15 hours, preferably 2 to 10 hours, preferably 3 to 8 hours, preferably 4 to 6 hours, preferably 6 hours to form the $La_2O_3$-γ-$Al_2O_3$ support.

The $La_2O_3$-γ-$Al_2O_3$ support includes rough and irregular-sized $La_2O_3$ and γ-$Al_2O_3$ particles. The γ-$Al_2O_3$ particles have a particle size in a range of 1 to 150 micrometers (μm), preferably 10 to 130 μm, preferably 30 to 110 μm, preferably 50 to 90 μm, or even more preferably about 70 μm. In some embodiments, a molar ratio of the $La_2O_3$ to the γ-$Al_2O_3$ present in the $La_2O_3$-γ-$Al_2O_3$ support is in a range of 5:1 to 1:10, preferably 1:1 to 1:5, or even more preferably 1:1 to 1:3. In some embodiments, the weight ratio of the gallium salt to the $La_2O_3$-γ-$Al_2O_3$ support is in a range of 1:1 to 1:50, preferably 1:5 to 1:30, or even more preferably 1:5 to 1:15. Other ranges are also possible.

At step 110, the method 100 includes mixing a gallium salt and the $La_2O_3$-γ-$Al_2O_3$ support in water to form a second mixture. In some embodiments, the gallium salt comprises gallium sulfate, gallium nitrate, gallium chloride, gallium acetate, gallium carbonate, gallium phosphate, and/or a hydrate thereof. In a preferred embodiment, the gallium salt is hydrated gallium nitrate.

At step 112, the method 100 includes drying the second mixture and calcining the second mixture at a temperature of about 500° C. to deposit $Ga_2O_3$ particles on surfaces of the $La_2O_3$-γ-$Al_2O_3$ support, thereby generating the $Ga_2O_3/La_2O_3$-γ-$Al_2O_3$. Typically, the calcination is carried out in a furnace preferably equipped with a temperature control system, which may provide a heating rate of up to 50° C./min, or preferably up to 40° C./min, or preferably up to 30° C./min, preferably up to 20° C./min, preferably up to 10° C./min, preferably up to 5° C./min. In some preferred embodiments, the second mixture is heated with a heating rate in the range of 1 to 15° C./min, preferably 3 to 10° C./min, preferably 5 to 6° C./min to a temperature range of 500 to 700, preferably 500° C. for 1 to 15 hours, preferably 2 to 10 hours, preferably 3 to 8 hours, preferably 4 to 6 hours, preferably 6 hours to form the $Ga_2O_3/La_2O_3$-γ-$Al_2O_3$. In some embodiments, the $Ga_2O_3$ particles present in the $Ga_2O_3/La_2O_3$-γ-$Al_2O_3$ are in the form of a layer having an average thickness of 50 to 1000 nm, preferably 100 to 800 nm, preferably 200 to 600 nm, or even more preferably 300 to 400 nm. Other ranges are also possible.

In some preferred embodiments, the $Ga_2O_3/La_2O_3$-γ-$Al_2O_3$ has a micropore area in a range of 1-15 m²/g, preferably 2-14 m²/g, preferably 4.5 to 13.5 m²/g. In some embodiments, the $Ga_2O_3/La_2O_3$-γ-$Al_2O_3$ has an average particle diameter in a range of 5-15 nm, preferably 6-14 nm, and preferably 7-13 nm. Other ranges are also possible.

The crystalline structures of the $Ga_2O_3/La_2O_3$-γ-$Al_2O_3$ catalyst may be characterized by X-ray diffraction (XRD). The XRD patterns are collected in a Mini-Flex II bench-top diffractometer equipped with a Cu-Kα radiation source (2=0.15406 nm) for a 2θ range extending between 5 and 100°, preferably 15 and 80°, further preferably 30 and 60° at an angular rate of 0.005 to 0.04° s⁻¹, preferably 0.01 to 0.03° s⁻¹, or even preferably 0.02° s⁻¹.

Figure 4:
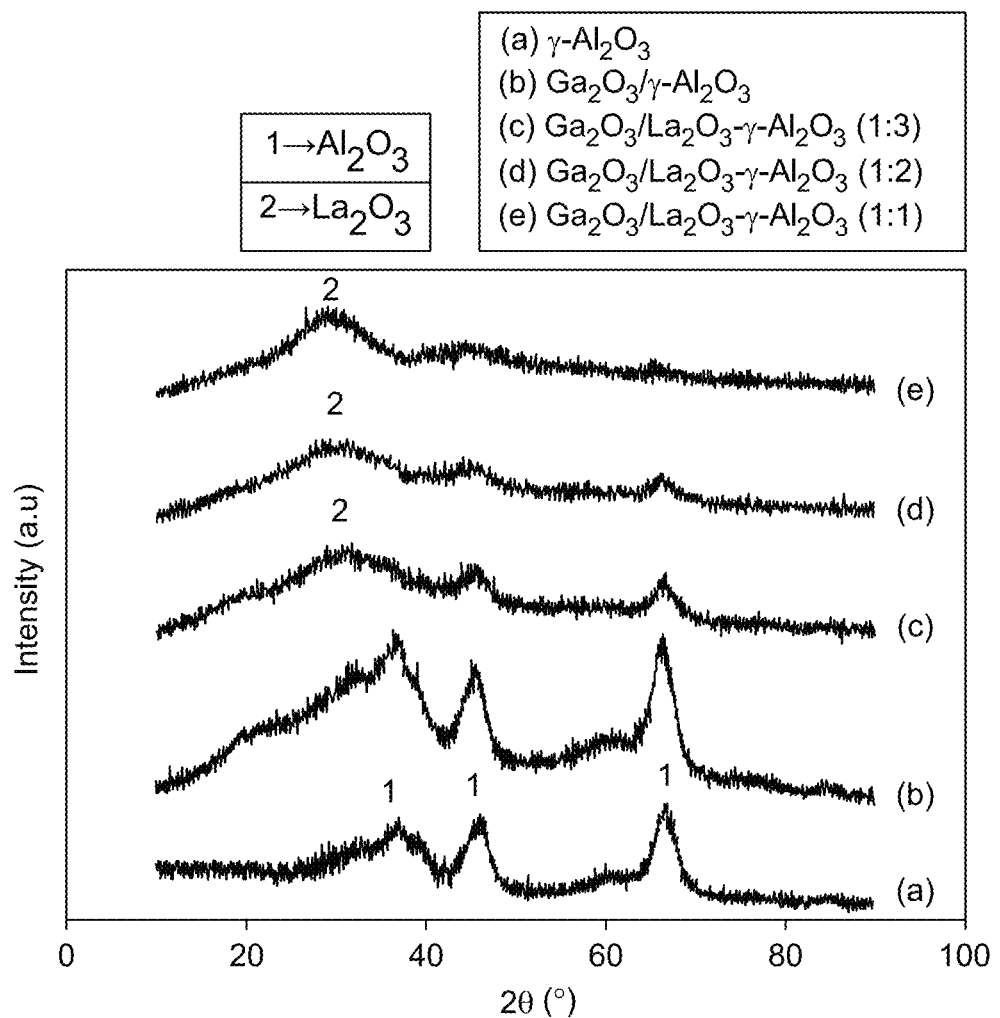
FIG. 4 depicts X-ray diffraction (XRD) profiles of various catalysts, including fresh $\gamma$-$Al_2O_3$, $Ga_2O_3$/$\gamma$-$Al_2O_3$, $Ga_2O_3$/$La_2O_3$—$\gamma$—$Al_2O_3$ (1:3), $Ga_2O_3$/$La_2O_3$—$\gamma$—$Al_2O_3$ (1:2), and $Ga_2O_3$/$La_2O_3$-$\gamma$-$Al_2O_3$ (1:1), according to certain embodiments.

Referring to FIG. 2, XRD profiles for $Ga_2O_3/La_2O_3$—γ—$Al_2O_3$ catalysts with different $Ga_2O_3$ loadings. In some embodiments, $Ga_2O_3/La_2O_3$-γ-$Al_2O_3$ catalyst has at least a first intense peak with a 2 theta (θ) value in a range of 25 to 40°, preferably about 30°; at least a second intense peak with a 2θ value in a range of 40 to 50°, preferably about 45°; at least a third intense peak with a 2θ value in a range of 60 to 75°, preferably about 70°, as depicted in FIG. 4.

The $Ga_2O_3/La_2O_3$-γ-$Al_2O_3$ catalyst has an improved propane conversion and propylene selectivity in the presence of $CO_2$ for ODH reactions. In some embodiments, the $Ga_2O_3/La_2O_3$-γ-$Al_2O_3$ catalyst having a molar ratio of $Ga_2O_3$ to a matrix of $La_2O_3$-γ$Al_2O_3$ about 1:1. The $Ga_2O_3/La_2O_3$-γ-$Al_2O_3$ (1:1) shows a propane conversion of 92% based on an initial weight of the propane in the propane-containing feed gas stream, and a propylene yield of about 56% based on the propane conversion at 600° C. in the presence of $CO_2$.

EXAMPLES

The following examples demonstrate a method for producing propylene ($C_3H_8$) via oxidative dehydrogenation (ODH) of propane using a $Ga_2O_3/La_2O_3$ catalyst as described herein. The examples are provided solely for illustration and are not to be construed as limitations of the present disclosure, as many variations thereof are possible without departing from the spirit and scope of the present disclosure.

Example 1: Experimental Section

The co-precipitation technique was used to synthesize the catalyst support. Ga was deposited on the support using the incipient wetness impregnation technique. All the chemicals employed in synthesizing the catalyst were obtained from commercial sources and, for this matter, were used without further purification. The following chemicals were used: $Al(NO_3)_3 \cdot 9H_2O$ as $Al_2O_3$ precursor, $La(NO_3)_3 \cdot 6H_2O$ as $La_2O_3$ precursor, and $Ga(NO_3)_3 \cdot H_2O$ as $Ga_2O_3$ precursor, and $(NH_4)_2CO_3$ as pH control and a precipitating agent.

Example 2: Synthesis of Support Materials

The $La_2O_3$-γ$Al_2O_3$ composite support was prepared by a coprecipitation technique [B. Xu, B. Zheng, W. Hua, Y. Yue, Z. Gao, Support effect in the dehydrogenation of propane in the presence of $CO_2$ over supported gallium oxide catalysts J. Catal. 239 (2006) 470-477; and M. L. Balogun, S. Adamu, I. A. Bakare, M. S. Ba-Shammakh, M. M. Hossain, $CO_2$ Assisted Oxidative Dehydrogenation of Propane to Propylene over Fluidizable $MoO_3/La_2O_3$—γ—$Al_2O_3$Catalysts, J. $CO_2$ Util. 42 (2020) 101329, each of which is incorporated herein by reference in their entireties]. The desired quantity of metallic nitrates precursors of lanthanum ($La(NO_3)_3 \cdot 6H_2O$) and aluminum ($Al(NO_3)_3 \cdot 9H_2O$) were dissolved in DI water. A buffer solution of ammonium carbonate (($NH_4)_2CO_3$) was added to maintain a pH of 8.5 to generate precipitates at about 40° C. with continuous stirring. The formed precipitate was aged for 2 h at 100° C., dried at 120° C. for 2 h, and then calcined at 500° C. for 6 h [M. L. Balogun, S. Adamu, M. S. Ba-Shammakh, M. M. Hossain, Promotional effects of $CO_2$ on the oxidative dehydrogenation of propane over mesoporous $VO_x$/γ-$Al_2O_3$ catalysts, J. Ind. Eng. Chem. (2020), which is incorporated herein by reference in its entirety]. The series of the catalyst support were synthesized by varying the mass ratio of lanthanum to aluminum as follows: La:Al=1:1, 1:2, and 1:3. The three series of composite supports were identified as $La_2O_3$-γ$Al_2O_3$ (1:1), $La_2O_3$-γ$Al_2O_3$ (1:2) and $La_2O_3$-γ$Al_2O_3$ (1:3). A reference γ$Al_2O_3$ support was synthesized using the same procedure with zero lanthanum incorporation.

Example 3: Deposition of an Active Site on the Support

Gallium was wet-impregnated over the surface of the support. The stoichiometric quantity, corresponding to 10 wt %, of hydrated gallium nitrate ($Ga(NO_3)_3 \cdot H_2O$) was added in DI water in accordance with the support's total pore volume, followed by the addition of the support to the solution [Y. Jiao, Y. Du, J. Zhang, C. Li, Y. Xue, J. Lu, J. Wang, Y. Chen, Steam reforming of n-decane for $H_2$ production over Ni modified La—$Al_2O_3$ catalysts: Effects of the active component Ni content, J. Anal. Appl. Pyrolysis. 116 (2015) 58-67, which is incorporated herein by reference in its entirety]. The system was subjected to continuous magnetic stirring for 3 h followed by drying at 120° C. for 6 h and subsequent calcination at 500° C. for 6 h under instrument-grade air flow [E. Goudarzi, R. Asadi, J. T. Darian, A. Shahbazi Kootenaei, The stability and catalytic performance of K-modified molybdena supported on a titanate nanostructured catalyst in the oxidative dehydrogenation of propane, RSC Adv. 9 (2019) 11797-11809, which is incorporated herein by reference in its entirety]. The resulting catalyst was identified as $Ga_2O_3$/γ-$Al_2O_3$, $Ga_2O_3/La_2O_3$-γ-$Al_2O_3$ (1:3), $Ga_2O_3/La_2O_3$—γ—$Al_2O_3$ (1:2), $Ga_2O_3/La_2O_3$-γ-$Al_2O_3$ (1:1). The complete catalyst synthesis steps are illustrated in FIG. 2A and FIG. 2B.

Example 4: X-Ray Diffraction (XRD)

The XRD characterization was conducted to categorize the relative concentration of the crystalline phases present in the $Ga_2O_3/La_2O_3$-γ-$Al_2O_3$ catalysts. In this regard, a Mini-Flex II bench-top XRD machine purchased from Rigaku equipped with a copper (Cu—$K_\alpha$) radiation source (λ=0.15406 nm) was used at a voltage of 40 kV and a current of 30 mA (manufactured by Rigaku, 3 Chome-9-12 Matsubaracho, Akishima, Tokyo 196-8666, Japan). For each sample, a 2θ scanning range of 10-90° with a 0.02 step size and scanning rate of 3°/min was utilized. The phase identification of the samples was achieved by comparing the recorded diffraction data of the samples with the JCPDS (Joint Committee on Powder Diffraction Standards) files.

Example 5: Fourier Transform Infrared Spectroscopy (FTIR)

The FTIR characterization technique uses an infrared spectrum of transmission absorption and photoconductivity via a substance either in a liquid or solid state. This technique reveals the functional groups/species and their characteristics on the support surfaces. The FTIR analysis was performed using Nicolet 6700 Series by Thermo Fisher Scientific (manufactured by Thermofischer Scientific, Massachusetts, U.S.A). Each analysis required a mixture of around 3 mg of the catalyst and 400 mg KBr as a uniform blend. The results from the FTIR were recorded in between 400 and 4000 cm-1 of spectrum.

Example 6: Scanning Electron Microscope-Energy Dispersive X-Ray (SEM-EDX) Analysis The SEM-EDX analysis was conducted to determine and analyze the surface morphology of the synthesized catalyst with different metal loading. The SEM analysis was carried out on a JEOL-SEM analyzer (manufactured by JEOL, 11 Dearborn Road Peabody, MA, USA). The elemental composition of the catalyst samples was determined by EDX analysis. In this regard, the powder sample was spread on a copper-covered stump. The gold-coated sample was used to ensure proper analysis and high quality, and the image was magnified a million times. All the measurement was conducted at ambient temperature.

Example 7: Textural Properties Analysis

The Brunauer-Emmett-Teller (BET) specific surface area and the prepared porosity were established using the Micromeritic model ASAP analyzer (manufactured by Micromeritics Inc., 4356 Communications Dr, Norcross, GA 30093, United States). The $N_2$ adsorption-desorption analysis was done using an estimated amount of 300 mg. The catalyst pretreatment, i.e., degassing, was carried out at approximately 473K, under vacuum, for 2.5 h to prevent any wetness and undesired impurities. The $N_2$ adsorption process was executed in a bath containing liquid nitrogen to maintain the temperature at about 77K and a relative pressure range of 10-6 to 1. The surface area was evaluated using Multiple point BET, while the BJH (Barrett, Joyner, and Halenda) was used in obtaining the pore volume [I. A. Bakare, S. A. Mohamed, S. Al-Ghamdi, S. A. Razzak, M. M. Hossain, H. I. de Lasa, Fluidized bed ODH of ethane to ethylene over VOx-MOO$_x$/γ-Al$_2$O$_3$ catalyst: Desorption kinetics and catalytic activity, Chem. Eng. J. 278 (2015) 207-216, which is incorporated herein by reference in its entirety].

Example 8: $NH_3$-TPD

An Autochem II 2920 chemisorption analyzer purchased from Micromeritics Inc. was utilized to analyze the acidity of the synthesized catalyst using ammonia TPD (manufactured by Micromeritics Inc., 4356 Communications Dr, Norcross, GA 30093, United States). The analysis is done by packing approximately 0.1 g of the catalyst between cotton wool in a U-tube quartz shape reactor which is then fitted to the sample port. The sample was reduced under 10% $H_2$ in a He carrier gas at a temperature of about 500° C., followed by degassing using argon for 2 h at the same temperature and then cooled down to 100° C. The catalyst was flooded with ammonia (5.52% $NH_3$ balanced with 94.48% helium) at 100° C. flowing at 50 ml/min for 1 h. Subsequently, any leftover ammonia was removed from the system by flowing (500 ml/min) helium at 100° C. The temperature of the system was raised to 750° C. at a rate of 10° C./min, while the desorption of the chemisorbed ammonia on the catalyst was monitored using a TCD detector in the effluent gas [S. Adamu, S. A. Razzak, M. M. Hossain, Fluidizable Ni/Ce-meso-Al$_2$O$_3$ for gasification of glucose: Effect of catalyst reduction on hydrogen selectivity, J. Ind. Eng. Chem. 64 (2018) 467-477, which is incorporated herein by reference in its entirety].

Example 9: $H_2$-TPR

The $H_2$-TPR (Temperature Programmed Reduction) experiment was carried out to study the reducibility of the Ga$_2$O$_3$ supported on La—Al binary oxide catalyst in an $H_2$ environment. The $H_2$-TPR analysis was conducted with the Micrometrics Autochem II 2920 equipment. The TPR experiment was used to determine (i) the Ga/support interaction, (ii) the $H_2$ uptake by Ga$_2$O$_3$, and (iii) the reduction/ activation temperature. About 10 mg of the catalyst sample was packed between glass wool in a quartz U-tube shape reactor, then mounted on the equipment. The sample was initially treated to eliminate volatile contaminants and traces of $H_2O$ by flowing argon at 500° C. The treated catalyst was then subjected to oxidation in a stream of 5% $O_2$ balance with Helium at 750° C. for about an hour. A 10% $H_2$ in Helium mixture was subsequently flown through the catalyst sample at a flow rate of 50 mL/min, simultaneously increasing the sample temperature from ambient to 850° C. at 10° C./min heating rate. The amount of $H_2$ consumed by the sample was determined using a calibrated TCD detector. The results from the experiment were presented as a plot of the amount of $H_2$ consumed versus the reduction of temperature or time. The area under the $H_2$-TPR curve is proportional to the amount of $H_2$ consumed.

Example 10: Thermo-gravimetric Analysis (TGA)

The TGA analysis was conducted to assess the thermal stability of the catalysts and to quantify the possibility of coke formation during the propane ODH using $CO_2$ as a mild oxidant. The spent catalyst sample was collected after their evaluation in the chemical reaction engineering center (CREC) Riser Simulator at different temperatures. In this regard, an SDT Q600 analyzer (TA Instruments, 159 Lukens Dr, New Castle, DE 19720, United States) was employed. For each analysis, 10 mg of spent catalyst samples were taken to the sample pan and carefully placed into the TGA furnace. The coke combustion (oxidation) experiment was conducted by circulating air (95 mL/min). The weight loss data was recorded up to 800° C. at 10° C./min heating rate.

Example 11: Propane ODH with Carbon Dioxide

Figure 3A:
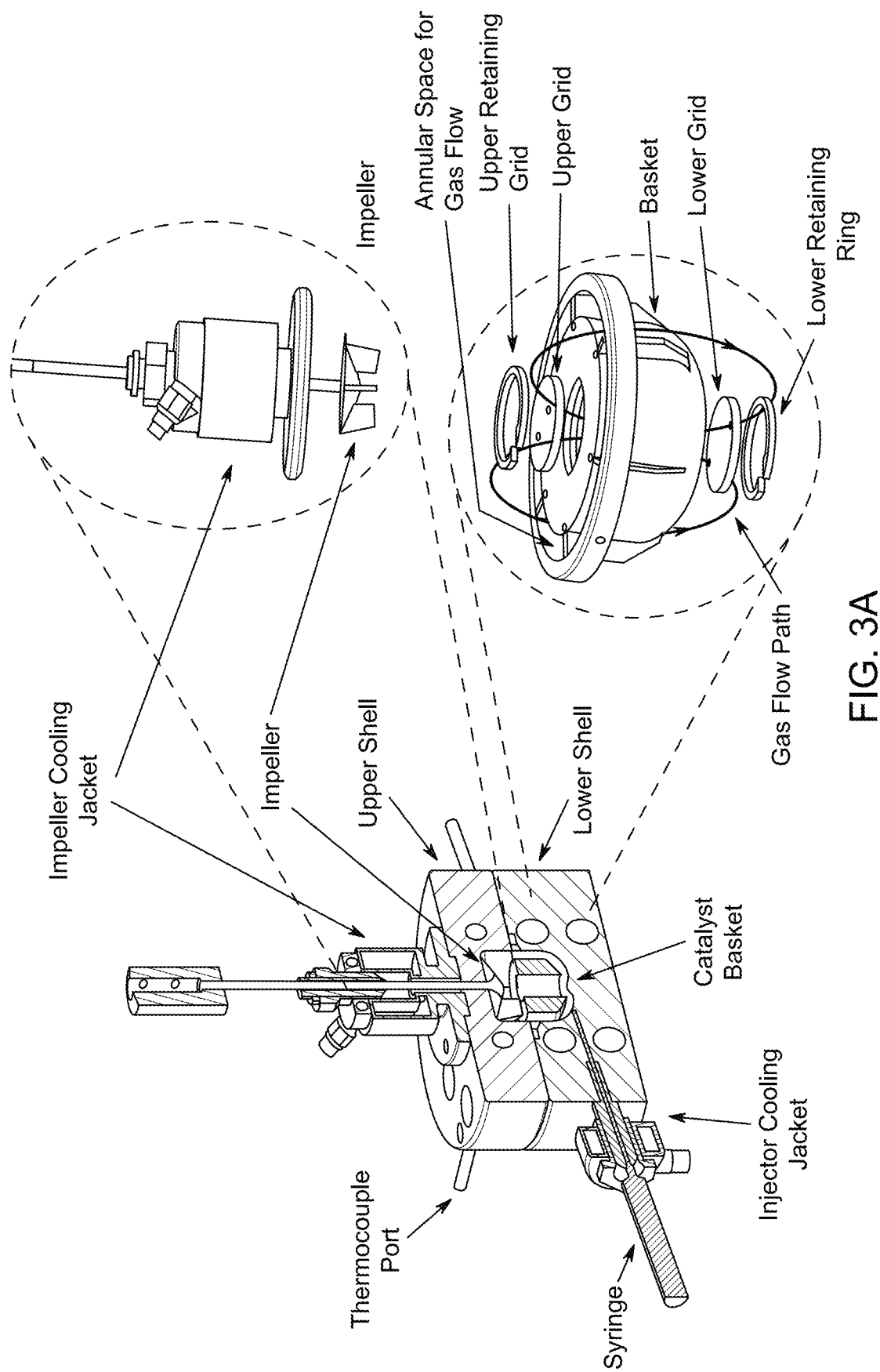
FIG. 3A is a comprehensive sectional view of a catalyst basket and an impeller of CREC Riser Simulator, according to certain embodiments.
Figure 3B:
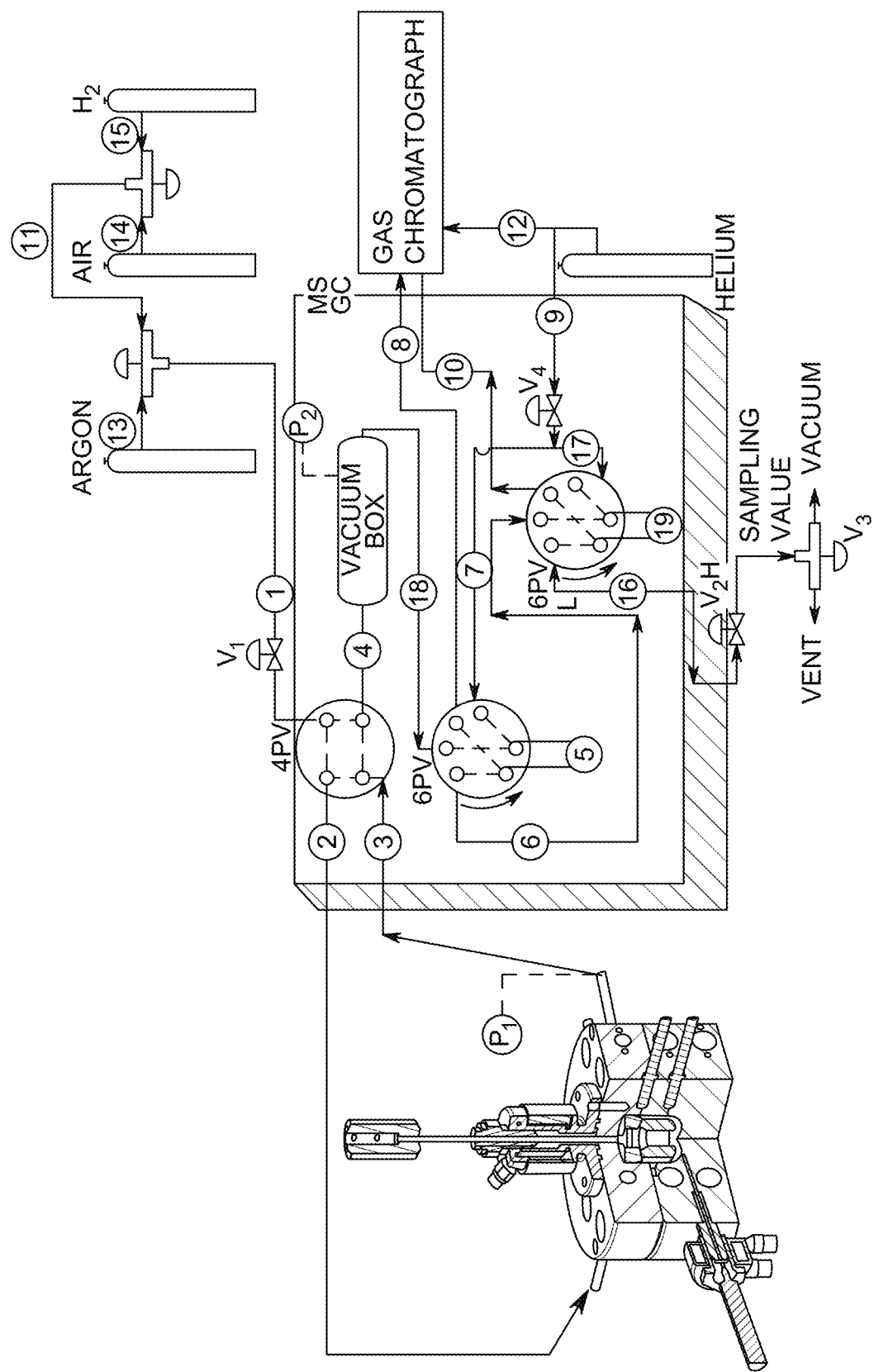
FIG. 3B is a graphical representation of the CREC Riser simulator setup, according to certain embodiments.

The $CO_2$-assisted propane ODH experiments using Ga$_2$O$_3$/La$_2$O$_3$-γAl$_2$O$_3$ catalyst were conducted in a fluidized-bed CREC Riser Simulator reactor as shown in FIGS. 3A and 3B with 53 cm$^3$ capacity. The fluidized CREC Riser Simulator is a benchtop batch reactor developed for testing and kinetic analyses of the synthesized catalyst conditions like fluidized bed reactor (downer and riser). There are two major segments in the CREC reactor (i) the upper section (ii) the lower section. The two segments allow for smooth disassembling, loading, and removing catalyst found in the central gasket. Major components like a retaining ring, impeller, grid, thermocouple, heater, and raw material injection section are located in the CREC reactor. The lower section encloses the reactor basket, with two porous grids at each end holding the catalyst in place. The impeller is found above the basket, and upon operating at high speed (maximum 7000 rpm), the catalyst gets fluidized, and the reactant gases are forced into the reactor basket through the porous grids for efficient diffusion. As part of the design, a vacuum box is connected to the reaction section via a 4-Port valve (PV) to collect the products during the reaction. The product is then analyzed by an online GC linked to the vacuum via a 6-PV, as presented in FIG. 3B [A. A. Ayandiran, I. A. Bakare, H. Binous, S. Al-Ghamdi, S. A. Razzak, M. M. Hossain, Oxidative dehydrogenation of propane to propylene over VOx/CaO-γ-Al$_2$O$_3$ using lattice oxygen, Cite This Catal. Sci. Technol. 6 (2014) 5154; and S. Al-Ghamdi, M. Volpe, M. M. Hossain, H. de Lasa, VOx/γ-Al$_2$O$_3$ catalyst for oxidative dehydrogenation of ethane to ethylene: Desorption kinetics and catalytic activity, Appl. Catal. A Gen. 450 (2013) 120-130, each of which is incorporated herein by reference in their entireties]. The ODH runs were conducted using approximately 0.2 g of the synthesized catalyst. Impurities were fluxed out of the system by passing argon gas, and a leak test was also done. The leak test was carried out by raising the reactor pressure to about 30 psi at ambient temperature. A stable pressure reading when the reactor is isolated indicates the reactor is leak free. When no leak is detected, the reactor's temperature progressively increases to the desired reaction temperature. The reactor was constantly purged with argon gas to prevent any oxygen interference. As the required pressure is approached, the reactor section is isolated from the vacuum section by a valve. With the aid of a vacuum pump, the pressure of the vacuum box was reduced to about 3 psi while keeping the reactor pressure at atmospheric pressure. Propane ODH with $CO_2$ was executed by injecting 4 ml carbon dioxide into the reactor using a syringe. The catalyst bed was then fluidized with the help of an impeller placed at the top of the reactor basket and operating at about 4500 rpm. At this moment, 2 mL of propane was injected into the fluidized bed by an airtight syringe. The ratio of $C_3H_8$:$CO_2$ used was 1:2. The 4-PV spontaneously opens when the specified reaction time is reached. This allows the formed product to be transported into the vacuum box instantaneously and prevents further reactions in the reactor. With the aid of the 6-VP, the product gas mixture was injected into the online GC (Agilent 7890A, Santa Clara, California, United States) for analysis. The online GC is equipped with a TCD (6 Ft ⅛ 2 mm HayeSep Q 80/100 Ni) to detect $CH_3$, CO, $CO_2$, and $H_2$, and the flame ionization detector (FID) (HP AL/S (8 µm) analytical column: 25 m×0.32 mm) which detects $CH_3$, $C_2H_6$, $C_2H_4$, $C_3H_8$, $C_3H_6$ and other hydrocarbons [S. A. Al-Ghamdi, H. I. de Lasa, Propylene production via propane oxidative dehydrogenation over VOx/γ-$Al_2O_3$ catalyst, Fuel. 128 (2014) 120-140, which is incorporated herein by reference in its entirety]. At the end of each reaction, the products were transferred to the GC and analyzed. The catalyst was then regenerated for 10 mins at 600° C. and at a mixing rate (impeller speed) of 5000 rpm in the presence of zero air to burn off the coke deposit on the catalyst.

$$\text{Propane conversion, } X_{C_3H_8}(\%) = \frac{\sum j z_j n_j}{3n_{propane} + \sum j z_j n_j} \times 100 \quad (4)$$

$$\text{Selectivity to a product, } S_j(\%) = \frac{z_j n_j}{\sum j z_j n_j} \times 100 \quad (5)$$

$$Y_i(\%) = \left(X_{C_3H_8} \times S_i\right)/100 \quad (6)$$

where, $n_j$ is the moles of j in product and, $z_j$ is the number of carbon atoms, $n_{propane}$ is unconverted propane (mole).

Example 12: XRD Analysis

FIG. 4 displays the XRD pattern of the bare γ-$Al_2O_3$, $Ga_2O_3$/$La_2O_3$-γ-$Al_2O_3$ with different lanthanum oxide loading of 0, 25, 33.3 and 50 wt %. The bare γ-$Al_2O_3$ curve exhibits a trio of characteristic peaks at two-theta values of 37.5, 45.5, and 67° (JCPDS 10-425), respectively [D. He, Y. Zhao, S. Yang, Y. Mei, J. Yu, J. Liu, D. Chen, S. He, Y. Luo, Enhancement of catalytic performance and resistance to the carbonaceous deposit of lanthanum (La) doped HZSM-5 catalysts for decomposition of methyl mercaptan, Chem. Eng. J. 336 (2018) 579-586; V. Mahdavi, A. Monajemi, Gas phase dehydration of glycerol catalyzed by gamma $Al_2O_3$ supported $V_2O_5$: a statistical approach for simultaneous optimization, RSC Adv. 6 (2016) 114244-114255; and G. Del Angel, A. Bonilla, Y. Peña, J. Navarrete, J. L. G. Fierro, D. R. Acosta, Effect of lanthanum on the catalytic properties of PtSn/γ-$Al_2O_3$ bimetallic catalysts prepared by successive impregnation and controlled surface reaction, J. Catal. 219 (2003) 63-73, each which is incorporated herein by reference in their entireties]. The intensity of the three peaks, attributed to pure γ-$Al_2O_3$, remained unaffected by the deposition of $Ga_2O_3$ on γ-$Al_2O_3$. Moreover, no peaks associated with gallium oxide were detected. This observation indicates that either gallium oxide is well dispersed over the surface of alumina support and/or the particle size of gallium oxide is below the detection limit of XRD [Yun, D.; Baek, J.; Choi, Y.; Kim, W.; Lee, H. J.; Yi, J. Promotional effect of Ni on a CrOx catalyst supported on silica in the oxidative dehydrogenation of propane with $CO_2$. ChemCatChem 2012, 4, 1952-1959; and Ascoop, I.; Galvita, V. V.; Alexopoulos, K.; Reyniers, M.-F.; Van Der Voort, P.; Bliznuk, V.; Marin, G. B. The role of $CO_2$ in the dehydrogenation of propane over WOx-VOx/$SiO_2$. J. Catal. 2016, 335, 1-10, each which is incorporated herein by reference in their entireties]. It is evident that lanthanum oxide incorporation into alumina influenced the crystalline structure, and a noticeable decrease in the peak intensities at 2θ values of 37.5, 45.5, and 67° for all the catalyst samples was observed [V. Mahdavi, A. Monajemi, Gas phase dehydration of glycerol catalyzed by gamma $Al_2O_3$ supported $V_2O_5$: a statistical approach for simultaneous optimization, RSC Adv. 6 (2016) 114244-114255, which is incorporated herein by reference in its entirety]. This may be attributed to the decrease in the particle size/crystallinity of γ$Al_2O_3$ or due to partial coverage by $La_2O_3$. The appearance of a new broad peak located at 2θ angle of 30° from samples containing lanthanum oxide is assigned to crystalline $La_2O_3$ [H. Bandaru, A. S. Mahomed, H. Singh, H. B. Friedrich, The effect of varying the metal ratio in a chromium molybdate catalysts for the oxidative dehydrogenation of n-octane, Mol. Catal. 460 (2018) 74-82; and H. Zhao, P. Jiang, Y. Dong, M. Huang, B. Liu, A high-surface-area mesoporous sulfated nano-titania solid superacid catalyst with exposed (101) facets for esterification: facile preparation and catalytic performance, New J. Chem. 38 (2014) 4541, each which is incorporated herein by reference in their entireties]. No peaks associated with the formation of $LaAlO_3$ are observed in contrast to what has been reported earlier [N. Xue, N. Liu, L. Nie, Y. Yu, M. Gu, L. Peng, X. Guo, W. Ding, 1-Butene cracking to propene over P/HZSM-5: Effect of lanthanum, J. Mol. Catal. A Chem. 327 (2010) 12-19; and J. Mazumder, H. I. De Lasa, Ni catalysts for steam gasification of biomass: Effect of $La_2O_3$ loading, Catal. Today. 237 (2014) 100-110] for lanthanum oxide loading higher than 10 wt. %, which can be assigned to lower calcination temperature.

Example 13: SEM-EDX Analysis

The images from the SEM micrographs and the data from the energy dispersive X-ray analysis EDX of the synthesized catalyst are displayed in FIG. 5. The SEM images display the surface morphology, whiles the EDX depicts the elements on the surface of the catalyst. All the catalyst samples containing $La_2O_3$ under investigation are made up of particles that are rough and irregular in shape and size, just like the pure γ-$Al_2O_3$. This observation shows that the incorporation of lanthanum oxide did not alter the morphology of the γ-$Al_2O_3$. There was insignificant interaction between the lanthanum oxide and the support, as observed in the FTIR results. The gallium oxide deposition over the support established a layer on the surface of the catalyst, as can be seen in FIGS. 5C-5D, as this layer was not present on the bare γAl$_2$O$_3$ in FIG. 5A. This is further confirmed by the results from the EDX, which shows that the elements present in the γAl$_2$O$_3$ sample were Al and O (FIG. 5E). At the same time, La and Ga were the additional elements found in Ga$_2$O$_3$/La$_2$O$_3$-γ-Al$_2$O$_3$ (1:1) samples (FIG. 5F). In general, the FIG. 5 micrographs indicate well-dispersed gallium oxide over the catalyst support (FIG. 5B-FIG. 5E). This could improve the active site and contact area for the efficient performance of the catalyst during the propane ODH reaction [D. Salinas, N. Escalona, G. Pecchi, J. L. G. Fierro, Lanthanum oxide behavior in La$_2$O$_3$—Al$_2$O$_3$ and La$_2$O$_3$—ZrO$_2$ catalysts with application in FAME production, Fuel. 253 (2019) 400-408, which is incorporated herein by reference in its entirety].

Example 14: Specific Surface Area and Porosity Analysis

The isotherms based on the volume of nitrogen adsorbed with respect to the relative pressure of all the samples under investigation are presented in FIG. 6A. It can be observed that all the catalyst samples exhibited similar shapes. The shape could be described as type IV isotherms with the H$_2$-type hysteresis loop at a relative pressure range of 0.5-0.9. This shows that the synthesized material is mesoporous, with bottleneck-like pores with wider bodies. The average pore size distribution (FIG. 6B) of the samples was found to be approximately 8.0 nm which falls within the IUPAC range of 2-50 nm. This further confirms that the material synthesized is mesoporous [H. Bandaru, A. S. Mahomed, S. Singh, H. B. Friedrich, The effect of varying the metal ratio in a chromium molybdate catalysts for the oxidative dehydrogenation of n-octane, Mol. Catal. 460 (2018) 74-82, which is incorporated herein by reference in its entirety]. The summary of the physicochemical parameters, including the BET surface area (SA), total pore volume (PV), and average pore diameter (PD), can be found in Table 1.

The N$_2$-adsorbtion isotherm was used to determine the catalyst samples' BET surface area.

From Table 1, the catalyst with the highest surface area (193 m$^3$/g) is the sample with zero La$_2$O$_3$ content, Ga$_2$O$_3$/γ-Al$_2$O$_3$. The incorporation of La$_2$O$_3$ in the support decreased the total surface area in the order 131.5, 92.2, and 44.0 m$^3$/g corresponding to Ga$_2$O$_3$/La$_2$O$_3$-γ-Al$_2$O$_3$ (1:3), Ga$_2$O$_3$/La$_2$O$_3$-γ-Al$_2$O$_3$ (1:2) and Ga$_2$O$_3$/La$_2$O$_3$-γ-Al$_2$O$_3$ (1:1) respectively. The total surface area of the sample decreased as the amount of La$_2$O$_3$ incorporated in the support increases. The total pore volume of the catalyst sample also reduced as the quantity of La$_2$O$_3$ in the support increased. The shrinkage of the surface area could be attributed to lanthanum oxide penetrating and blocking the bottleneck-like mesopore of the support. The enhancement in average pore size distribution further validated this observation, and variations in the average pore diameter were noted from 7.12, 7.52, 8.01 to 12.06 nm for Ga$_2$O$_3$/γ-Al$_2$O$_3$, Ga$_2$O$_3$/La$_2$O$_3$—γ—Al$_2$O$_3$ (1:3), Ga$_2$O$_3$/La$_2$O$_3$—γ—Al$_2$O$_3$ (1:2) and Ga$_2$O$_3$/La$_2$O$_3$—γ—Al$_2$O$_3$ (1:1) respectively based as the La$_2$O$_3$ content. Incorporating about 3-5% lanthanum oxide in γ-Al$_2$O$_3$ support increases the catalyst's specific surface area [H. Zhao, P. Jiang, Y. Dong, M. Huang, B. Liu, A high-surface-area mesoporous sulfated nano-titania solid superacid catalyst with exposed (101) facets for esterification: facile preparation and catalytic performance, New J. Chem. 38 (2014) 4541; and M. C. Sánchez-Sánchez, R. M. Navarro, J. L. G. Fierro, Ethanol steam reforming over Ni/La—Al$_2$O$_3$ catalysts: Influence of lanthanum loading, Catal. Today. (2007)]. Nonetheless, it was observed that adding more than 10% lanthanum oxide in γ-Al$_2$O$_3$ results in a decrease in the catalyst surface area.

TABLE 1

Physicochemical properties of the gallium-supported catalyst

| Catalyst | La in support (wt %) | Micropore area (m$^2$/g) | External SA (m$^2$/g) | BET SA (m$^2$/g) | Total PV (cm$^3$/g) | Average PD (nm) |
|---|---|---|---|---|---|---|
| Ga$_2$O$_3$/γ-Al$_2$O$_3$ | 0.00 | 180.2 | 12.8 | 193.0 | 0.343 | 7.12 |
| Ga$_2$O$_3$/La$_2$O$_3$-γ-Al$_2$O$_3$ (1:3) | 25.00 | 13.4 | 118.2 | 131.5 | 0.195 | 7.52 |
| Ga$_2$O$_3$/La$_2$O$_3$-γ-Al$_2$O$_3$ (1:2) | 33.33 | 12.2 | 80.0 | 92.2 | 0.164 | 8.01 |
| Ga$_2$O$_3$/La$_2$O$_3$-γ-Al$_2$O$_3$ (1:1) | 50.00 | 4.7 | 39.3 | 44.0 | 0.133 | 12.06 |

Example 15: Acidity by NH$_3$-TPD

The NH$_3$-TPD experiment was conducted to obtain the surface acidity of the catalyst samples, as depicted in FIG. 7. The sample with zero lanthanum oxide loading exhibited two characteristic peaks: a broad peak with a maximum peak temperature at 200° C. and a narrow peak centered at 600° C. corresponding to the desorption of physisorbed ammonia species at the moderate/weak and strong acid sites respectively [J. Lu, X. Li, S. He, C. Han, G. Wan, Y. Lei, R. Chen, P. Liu, K. Chen, L. Zhang, Y. Luo, Hydrogen production via methanol steam reforming over Ni-based catalysts: Influences of Lanthanum (La) addition and supports, Int. J. Hydrogen Energy. 42 (2017) 3647-3657, which is incorporated herein by reference in its entirety]. The rest of the catalyst samples with lanthanum oxide incorporation display three distinct desorption peaks: two small peaks centered around 200° C., and 300° C. and a third broad peak with a maximum peak temperature at 650° C. corresponds to the desorption of adsorbed NH$_3$ at weak, moderate, and strong acid site respectively. The area under the NH$_3$-TPD curve at lower temperatures correlates to the weak/moderate acid site decrease with increased lanthanum oxide contents. However, the area under the curve at high temperatures region relating to the desorption of physisorbed NH$_3$ at the strong acid site increases with increasing amount of lanthanum oxide. This behavior can be assigned to the existence of coordinated ion of $La^{3+}$ functioning as a Lewis acid site. In this situation, the cation, $La^{3+}$ could be responsible for the acid site density dynamics [L. P. Haack, J. E. deVries, K. Otto, M. S. Chattha, Characterization of lanthanum-modified γ-alumina by x-ray photoelectron spectroscopy and carbon dioxide absorption, Appl. Catal. A, Gen. 82 (1992) 199-214; and J. Mazumder, H. I. de Lasa, Fluidizable $La_2O_3$ promoted Ni/γ-$Al_2O_3$ catalyst for steam gasification of biomass: Effect of catalyst preparation conditions, Appl. Catal. B Environ. 168-169 (2015) 250-265, each of which is incorporated herein by reference in their entireties]. The total acidity of the catalyst samples under investigation decreases as the quantity of $La_2O_3$ incorporated in the support increases, as seen in Table 2. This suggests that the lanthanum oxide could be responsible for reducing the acid site on the catalyst sample [Y. Zhang, Y. Zhou, H. Liu, Y. Wang, Y. Xu, P. Wu, Effect of La addition on the catalytic performance of PtSnNa/ZSM-5 catalyst for propane dehydrogenation, Appl. Catal. A Gen. 333 (2007) 202-210, which is incorporated herein by reference in its entirety]. The decline in the acid site is attributed to; i) pore adjustment due to the $La_2O_3$ incorporated, resulting in pore entrance blockage as observed in the $N_2$ adsorption/desorption analysis, and ii) the formation of the basic site that neutralizes the acid sites on the support [Y. Sugi, Y. Kubota, K. Komura, N. Sugiyama, M. Hayashi, J. H. Kim, G. Seo, Shape-selective alkylation and related reactions of mononuclear aromatic hydrocarbons over H-ZSM-5 zeolites modified with lanthanum and cerium oxides, Appl. Catal. A Gen. 299 (2006) 157-166, which is incorporated herein by reference in its entirety].

TABLE 2

The quantitative results of $NH_3$-TPD, including desorption temperature and $NH_3$ uptake

| Catalyst sample | Peaks | | $NH_3$ (mmolg$^{-1}$) | | |
|---|---|---|---|---|---|
| | Low T (° C.) | High T (° C.) | Low T (° C.) | High T (° C.) | Total $NH_3$ (mmolg$^{-1}$) |
| $Ga_2O_3$/γ-$Al_2O_3$ | 200 | 600 | 0.365 | 0.136 | 0.501 |
| $Ga_2O_3$/$La_2O_3$-γ-$Al_2O_3$ (1:3) | 190 | 645 | 0.267 | 0.1814 | 0.448 |
| $Ga_2O_3$/$La_2O_3$-γ-$Al_2O_3$ (1:2) | 190 | 650 | 0.244 | 0.198 | 0.443 |
| $Ga_2O_3$/$La_2O_3$-γ-$Al_2O_3$ (1:1) | 190 | 650 | 0.177 | 0.225 | 0.402 |

Example 16: $H_2$-Temperature Programmed Reduction ($H_2$-TPR)

The $H_2$-TPR was conducted to show the catalyst reduction/activation temperature and the degree of metal-support interaction, which ultimately influences the catalytic performance. In the case of $CO_2$-assisted propane ODH, $H_2$-TPR becomes important, given that the catalyst can actively participate (with lattice oxygen) in the redox mechanism of the oxidative propane reactions. $H_2$-TPR provides the degree of reduction of the catalysts and the amount of lattice oxygen available for reaction. FIG. 8 shows the TPR results of $Ga_2O_3$/γ-$Al_2O_3$, $Ga_2O_3$/$La_2O_3$-γ-$Al_2O_3$ (1:3), $Ga_2O_3$/$La_2O_3$—γ—$Al_2O_3$ (1:2) and $Ga_2O_3$/$La_2O_3$—γ—$Al_2O_3$ (1:1). The sample $Ga_2O_3$/γ-$Al_2O_3$ without $La_2O_3$ content exhibited one small peak at around 410° C. followed by a shoulder centred at approximately 575° C. The reduction of gallium oxide ($Ga_2O_3$) gives gallium suboxide ($Ga_2O$) according to $Ga_2O_3+2H_2 \rightarrow Ga_2O+2H_2O$ [M. Raad, A. Astafan, S. Hamieh, J. Toufaily, T. Hamieh, J. D. Comparot, C. Canaff, T. J. Daou, J. Patarin, L. Pinard, Catalytic properties of Ga-containing MFI-type zeolite in cyclohexane dehydrogenation and propane aromatization, J Catal 365 (2018) 376-390, which is incorporated herein by reference in its entirety], although a different support material was used. The peak intensity of this sample is the lowest among the four series of catalysts. The $La_2O_3$ containing $Ga_2O_3$/$La_2O_3$-γ-$Al_2O_3$ (1:3), $Ga_2O_3$/$La_2O_3$-γ-$Al_2O_3$ (1:2) and $Ga_2O_3$/$La_2O_3$-γ-$Al_2O_3$ (1:1) catalyst displayed the reduction peaks at 480, 485 and 510° C., respectively. The appearance of a single reduction peak suggests that only one type of $La_2O_3$ phase may exist in the catalyst samples. The area under the reduction peaks increased as the $La_2O_3$/γ-$Al_2O_3$ ratio (the $La_2O_3$ contents) increased in the samples, showing hydrogen consumption due to additional $La_2O_3$ reduction. There is also a slight increase in the reduction peak temperature with an increase in the $La_2O_3$/γ-$Al_2O_3$ ratio (the amount of $La_2O_3$), showing a difficult reduction of $La_2O_3$ at elevated La contents. This observation shows that $La_2O_3$ addition hinders easier reduction of the catalyst, where a shift of reduction peak maxima to a higher temperature with La incorporation. The shift of the reduction peak could be assigned to the various sizes of $La_2O_3$ forming over the catalyst surface. Generally, the smaller particles lead to lower reduction temperatures [S. Tan, L. B. Gil, N. Subramanian, D. S. Sholl, S. Nair, C. W. Jones, J. S. Moore, Y. Liu, R. S. Dixit, J. G. Pendergast, Catalytic propane dehydrogenation over $In_2O_3$—$Ga_2O_3$ mixed oxides, Appl. Catal. A: Gen. 498 (2015) 167-175, which is incorporated herein by reference in its entirety]. The presence of $Ga_3+$ ions in $Ga_2O_3$-γ$Al_2O_3$ plays an important role in reducing the oxidation of other species present in the catalyst [T. Nakatani, T. Watanabe, M. Takahashi, Y. Miyahara, H. Deguchi, S. Iwamoto, H. Kanai, M. Inoue, Characterization of γ-$Ga_2O_3$-$Al_2O_3$Prepared by Solvothermal Method and Its Performance for Methane-SCR of NO, Phys. Chem. A 2009, 113, 25, 7021-7029, which is incorporated herein by reference in its entirety].

Example 17: Fourier-Transform Infrared Spectroscopy (FTIR)

Figure 9:
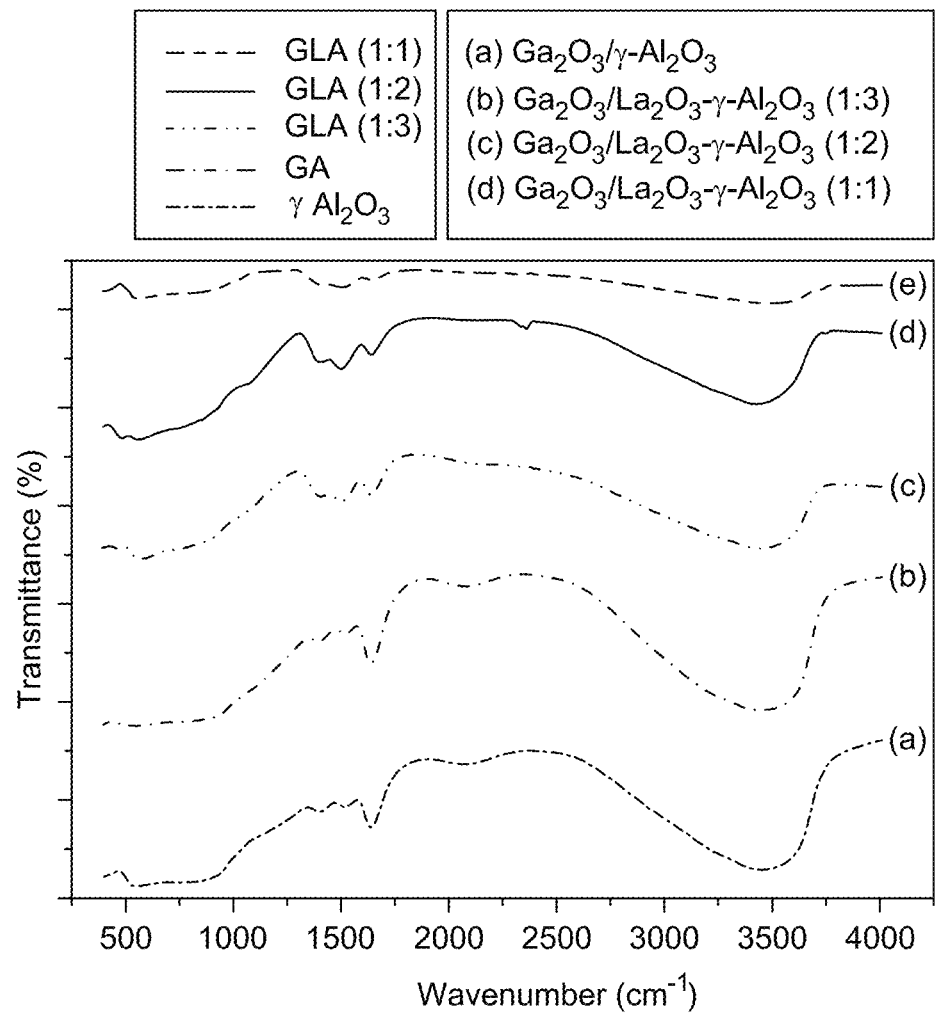
FIG. 9 shows a Fourier Transform Infrared (FTIR) spectra of $Ga_2O_3$/$\gamma$-$Al_2O_3$, $Ga_2O_3$/$La_2O_3$-$\gamma$-$Al_2O_3$ (1:3), $Ga_2O_3$/$La_2O_3$-$\gamma$-$Al_2O_3$ (1:2), and $Ga_2O_3$/$La_2O_3$-$\gamma$-$Al_2O_3$ (1:1), according to certain embodiments.

The FTIR spectroscopy is the adsorption spectroscopic method used to explain the vibrational transitions in materials. These are generated by the bending motion or stretching in the chemical bonds in the metal oxide [J. Gangwar, B. Kumar Gupta, S. K. Tripathi, and A. K. Srivastava, Phase dependent thermal and spectroscopic responses of $Al_2O_3$ nanostructures with different morphogenesis, Nanoscale 7 (2015) 13313-13344]. The FTIR of γ-$Al_2O_3$, $Ga_2O_3$/γ-$Al_2O_3$, and $Ga_2O_3$/$La_2O_3$-γ-$Al_2O_3$ with different lanthanum loading is displayed in FIG. 9. As one can see, all the catalyst samples display similar curves as γ-$Al_2O_3$. However, peak intensities are found to be decreased with an increase in the amount of $La_2O_3$. The broad band at 3500 cm-1 and the narrow band at 1630 cm-1 are attributed to the bending vibration mode of O—H and the stretching vibration of H—O—H due to the water molecule being weakly adsorbed on the catalyst support [J. Gangwar, B. Kumar Gupta, S. K. Tripathi, and A. K. Srivastava, Phase dependent thermal and spectroscopic responses of $Al_2O_3$ nanostructures with different morphogenesis, Nanoscale 7 (2015) 13313-13344; and A. Khodadadi Darban, Y. Kianinia, E. Taheri-Nassaj, Synthesis of nano-alumina powder from impure kaolin and its application for arsenite removal from aqueous solutions, J. Environ. Heal. Sci. Eng. 11 (2013) 1-11, each of which is incorporated herein by reference in their entireties]. The broad peak between 500 cm-1 and 1000 cm-1 displays strong absorption, which is assigned to the vibration mode of oxides of Al (Al—O) [A. H. Fakeeha, M. A. Naeem, W. U. Khan, A. E. Abasaeed, and A. S. Al-Fatesh, Reforming of methane by $CO_2$ over bimetallic Ni—Mn/$\gamma$-$Al_2O_3$ catalyst, Chinese J. Chem. Phys., 27 (2014) 214-220, which is incorporated herein by reference in its entirety].

Example 18: $CO_2$ Assisted Catalytic Propane Oxidative Dehydrogenation

The propane ODH tests were carried out with $Ga_2O_3$/$\gamma Al_2O_3$ and $Ga_2O_3$/$La_2O_3$-$\gamma Al_2O_3$ catalysts in a fluidized CREC Riser Simulator using $CO_2$ as a mild oxygenate. The catalytic evaluation tests utilized approximately 0.2 g of the fresh catalyst subjected to various temperatures between 50° and 600° C. at a residence time of 30 s. The product stream mainly contains ethylene and propylene; however, methane ($CH_4$), ethane ($C_2H_6$), CO, and $CO_2$ are minor products. All experiments were conducted at least in triplicates to demonstrate reliable and reproducible results. The measurement of carbon balance was based upon all major and minor products as mentioned above, and the deposited carbon over the surface of the catalyst was found to be within +6.5%.

To evaluate the impact of $CO_2$ during propane ODH, a series of three separate experimental tests were conducted—a) propane ODH with a single propane injection both in the presence and absence of $CO_2$, and re-oxidization of catalyst using air at the end of each run, b) propane ODH with multiple injections in the absence of air, i.e., no catalyst regeneration. This set of experiments facilitated to identify $CO_2$ role in affecting product selectivity as well as in-situ regeneration of the catalyst; hence, the successive propane injection was used for complete reduction of the catalyst, and finally, c) propane and $CO_2$ were co-fed over pre-reduced catalysts to determine the role of $CO_2$ in re-oxidizing the catalyst, converting propane as well as affecting product selectivity. The propane ODH experiments with a single injection are also categorized, i.e., i) propane ODH in the absence of $CO_2$—to evaluate reaction/re-oxidation cycles of $Ga_2O_3$/$La_2O_3$-$\gamma Al_2O_3$ pre-oxidized catalysts during their interaction with propane, ii) investigating reaction/regeneration cycles during $CO_2$-assisted propane ODH to examine reactants interaction with each other and with fully oxidized catalyst.

Example 19: ODH of $C_3H_8$ with and with the Presence of $CO_2$

Figure 10A:
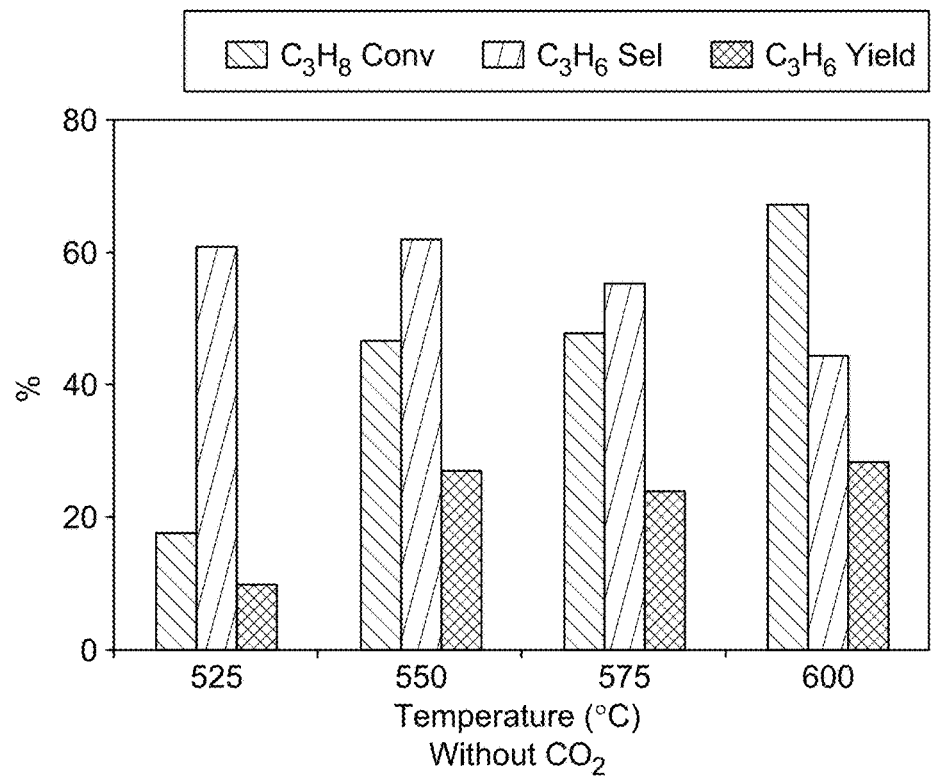
FIG. 10A is a plotted graph showing the propane conversion, propylene yields, and propylene selectivity over the $Ga_2O_3$/$\gamma$-$Al_2O_3$ catalyst in the absence of $CO_2$, according to certain embodiments.
Figure 10B:
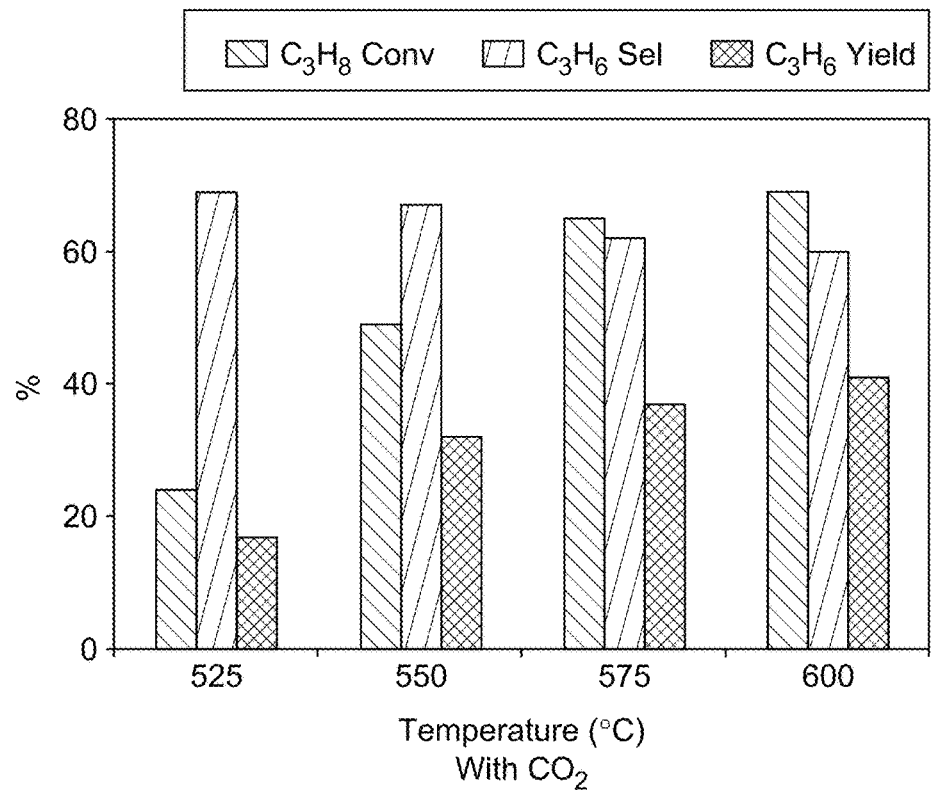
FIG. 10B is a plotted graph showing the effect of $CO_2$ on propane conversion, propylene yields, and propylene selectivity over the $Ga_2O_3$/$\gamma$-$Al_2O_3$ catalyst, according to certain embodiments.

FIG. 10 compares the propane ODH over $Ga_2O_3$/$\gamma$-$Al_2O_3$ without and with $CO_2$; it can be observed that the catalyst performance is more enhanced in the $CO_2$ environment. This shows that $CO_2$ affects in the catalytic performance of the $Ga_2O_3$/$\gamma$-$Al_2O_3$ catalyst. The propane conversion and propylene yield over $Ga_2O_3$/$\gamma$-$Al_2O_3$ catalyst in the presence of $CO_2$ was 65% and 37% (FIG. 10B), respectively, compared with 44 and 22%, respectively, in the absence of $CO_2$ at the same reaction temperature of 575° C. (FIG. 10A).

Figure 11:
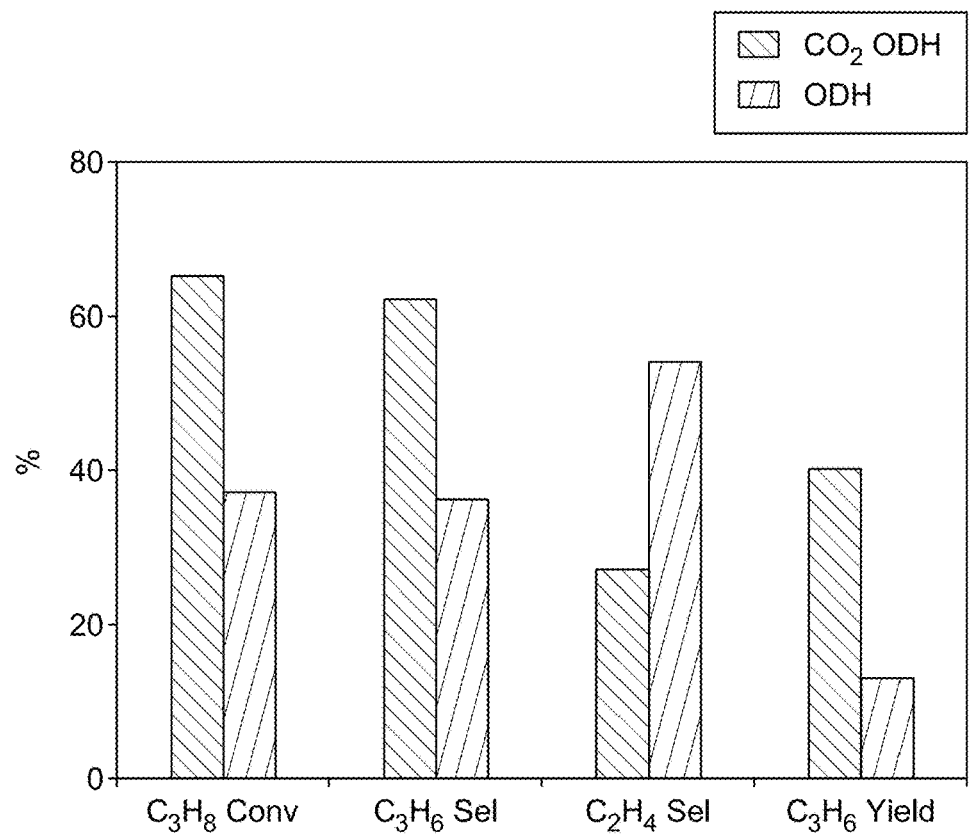
FIG. 11 is a plotted graph showing the effect of $CO_2$ on propane conversion, propylene yields, and propylene selectivity over the $Ga_2O_3$/$La_2O_3$-$\gamma$-$Al_2O_3$ catalyst, according to certain embodiments.

FIG. 11 presents a similar observation where the addition of $CO_2$ to the dehydrogenation reaction over $Ga_2O_3$/$La_2O_3$-$\gamma$-$Al_2O_3$ (1:1) records higher propane conversion (65%), propylene yield (40%), and propylene selectivity (62%) as compared to the dehydrogenation in the absence of $CO_2$ with corresponding propane conversion of 37%, propylene yield of 13%, and propylene selectivity of 36%. CO was detected as part of the products of the dehydrogenation reaction in the presence of $CO_2$, indicating that the continuous removal of hydrogen via reverse water gas shift (RWGS), as demonstrated in reaction 2, leads to enhanced catalytic performance [Ren, Y.; Zhang, F.; Hua, W.; Yue, Y.; Gao, Z. ZnO supported on high silica HZSM-5 as new catalysts for dehydrogenation of propane to propene in the presence of $CO_2$. Catal. Today 2009, 148, 316-322, which is incorporated herein by reference in its entirety].

Example 20: Effects of Reaction Temperature on $CO_2$-Assisted Propane ODH

Figure 12A:
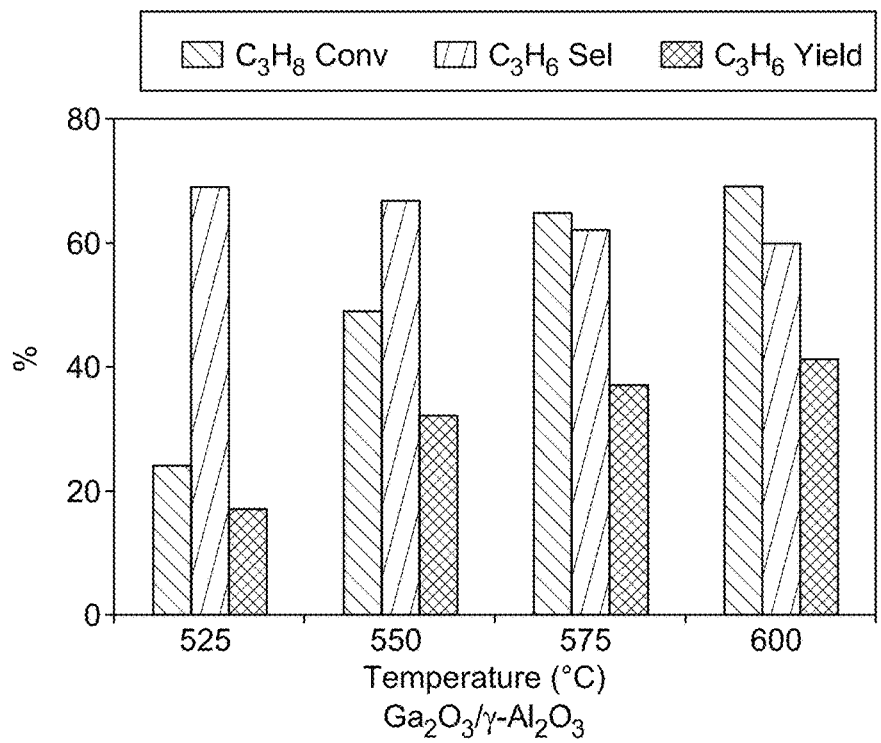
FIG. 12A is a plotted graph showing the effect of temperature on propane conversion, propylene selectivity, and propylene yields over the $Ga_2O_3$/$\gamma$-$Al_2O_3$ catalyst, according to certain embodiments.
Figure 12B:
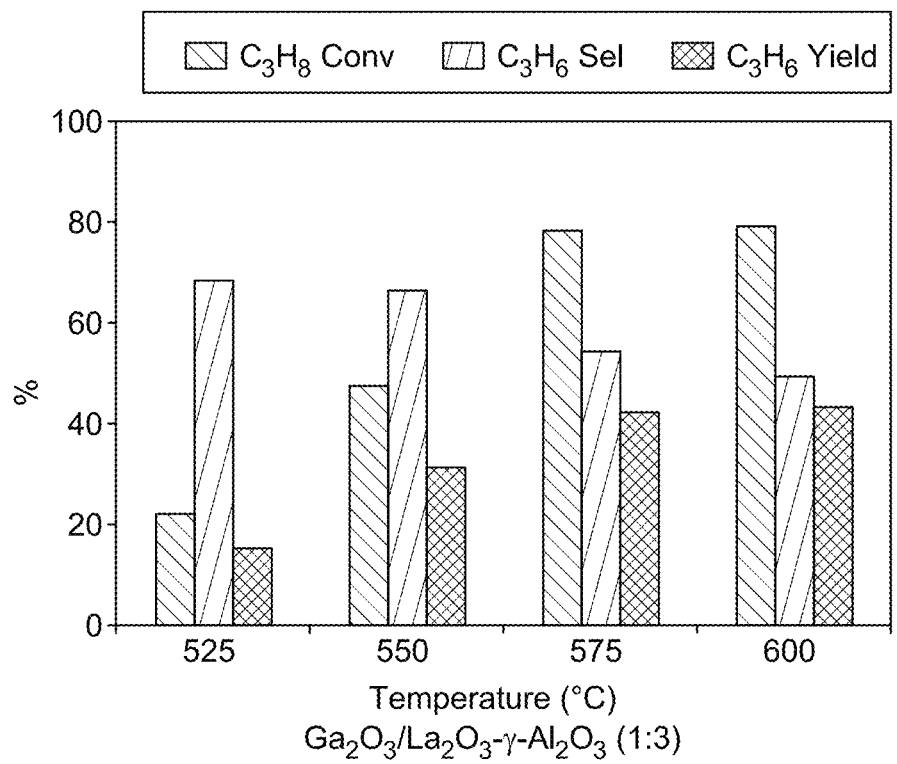
FIG. 12B is a plotted graph showing the effect of temperature on propane conversion, propylene selectivity, and propylene yields over the $Ga_2O_3$/$La_2O_3$-$\gamma$-$Al_2O_3$ (1:3) catalyst, according to certain embodiments.
Figure 12C:
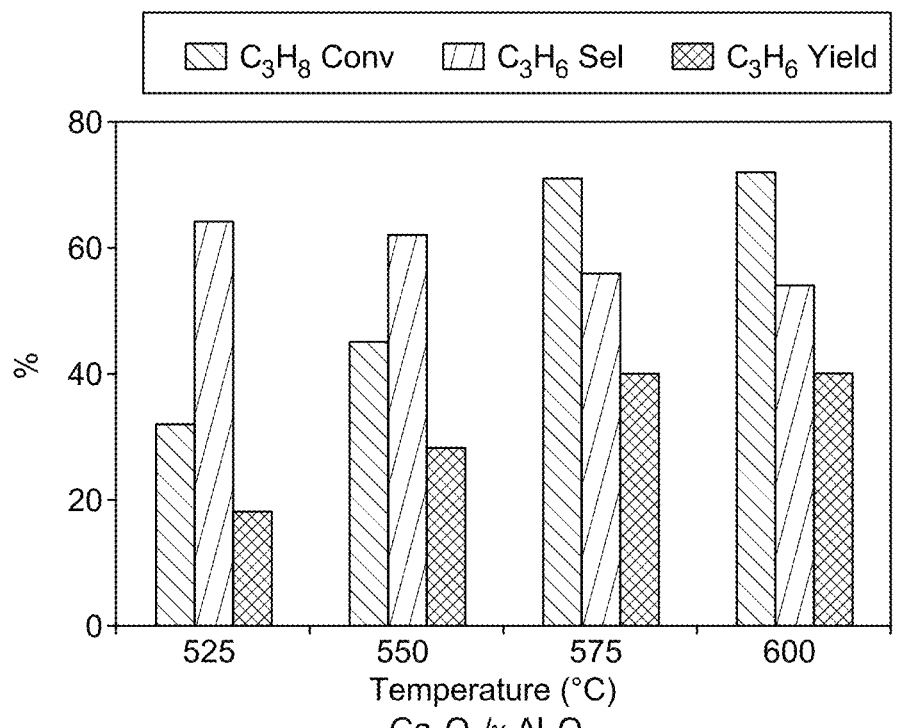
FIG. 12C is a plotted graph showing the effect of temperature on propane conversion, propylene selectivity, and propylene yields over the $Ga_2O_3$/$La_2O_3$-$\gamma$-$Al_2O_3$ (1:2) catalyst, according to certain embodiments.
Figure 12D:
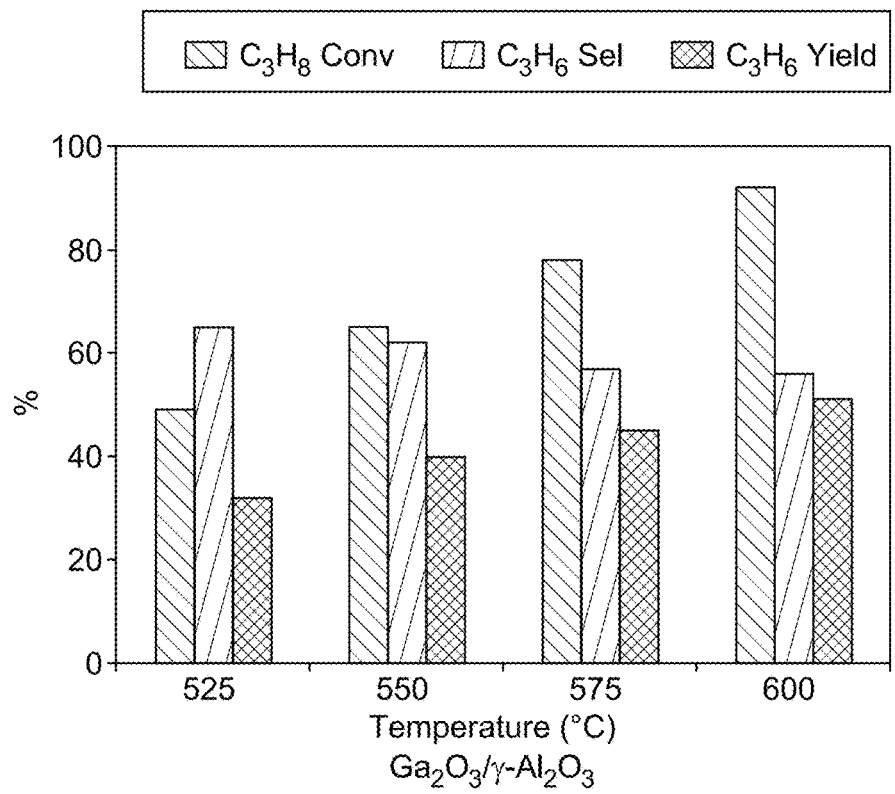
FIG. 12D is a plotted graph showing the effect of temperature on propane conversion, propylene selectivity, and propylene yields over the $Ga_2O_3/La_2O_3$-γ-$Al_2O_3$ (1:1) catalyst, according to certain embodiments.

FIG. 12 presents the propane ODH results regarding conversion, yield, and selectivity of both the $Ga_2O_3$/$\gamma Al_2O_3$ (FIG. 12A) and $Ga_2O_3$/$La_2O_3$-$\gamma$-$Al_2O_3$ (1:3), $Ga_2O_3$/$La_2O_3$—$\gamma$—$Al_2O_3$ (1:2), and $Ga_2O_3$/$La_2O_3$-$\gamma$-$Al_2O_3$ (1:1) catalysts (FIG. 12B-12D). The conversion data shows that propane conversion increased linearly concerning temperature for all the tested catalysts. For example, $Ga_2O_3$/$\gamma Al_2O_3$ catalyst exhibited a propane conversion of 16% at 525° C., reaching 62% with an increase in the reaction temperature to 600° C. The $H_2$-TPR results in FIG. 8 showed the presence of lattice oxygen, and the activation of this lattice oxygen at higher ODH temperature plays a role in enhancing propane conversion with respect to temperature for all the tested catalysts. Moreover, the activated lattice oxygen interaction with propane (C—H bond) converts it to both major and minor products. C—H bond activation also promoted due to higher reaction temperatures facilitating enhanced propane conversion. The La-containing catalyst $Ga_2O_3$/$La_2O_3$-$\gamma Al_2O_3$ displayed relatively higher propane conversion at the desired range of reaction temperatures than the $Ga_2O_3$/$\gamma Al_2O_3$ catalyst. These findings are consistent with the reduction profiles of FIG. 8, where the $Ga_2O_3$/$La_2O_3$-$\gamma Al_2O_3$ catalyst has demonstrated a more straightforward reduction, unlike the $Ga_2O_3$/$\gamma Al_2O_3$ catalyst. This implies that the $Ga_2O_3$/$La_2O_3$-$\gamma Al_2O_3$ catalyst can easily activate the C—H bond due to its higher lattice oxygen capacity. However, the difference in propane conversion at higher temperatures (>600° C.) is less. This may be attributed to the contribution of possible thermal cracking of propane.

In addition to lattice oxygen, textural properties such as specific surface area also play a role in influencing the catalytic performance during propane ODH. The specific surface area results in Table 1 indicate that La incorporation has negatively affected the specific surface area of $Ga_2O_3$/$\gamma$-$Al_2O_3$. This decrease in specific surface area is also one of the factors behind lower propane conversions at the higher amounts of La. The reduction in the specific surface area leads to the reduced number of active sites for propane adsorption during propane ODH. La incorporation and its contents may reduce hydrocarbon conversions during propane ODH.

Figure 13:
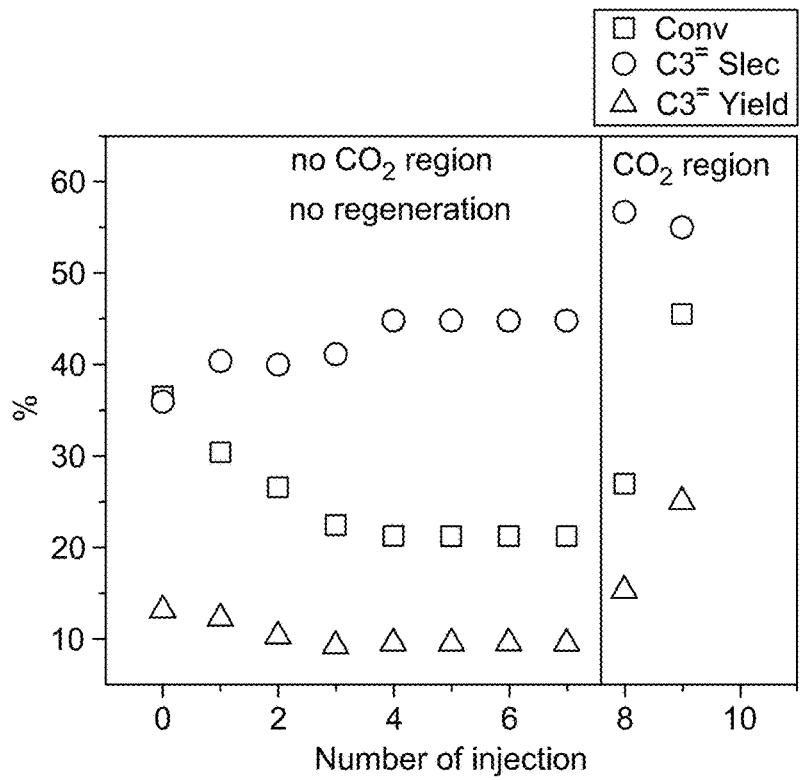
FIG. 13 is a plotted graph showing $C_3H_8$ conversion and propylene selectivity over $Ga_2O_3/La_2O_3$—γ—$Al_2O_3$ (1:1) in consecutive 8 injections of propane, while the $9^{th}$ and $10^{th}$ injections had $C_3H_8/CO_2$ in the ratio of 1:2 and 1:3 respectively, with no regeneration of catalyst, according to certain embodiments.

Example 21: Catalyst Stability Under Successive $C_6H_8$ Injection with and without $CO_2$ The experiments with successive propane injection were performed by subjecting the $Ga_2O_3$/$La_2O_3$-$\gamma$-$Al_2O_3$ (1:1) catalyst to consecutive propane injection in the CREC Riser Simulator. The ODH experiment was performed for about ten consecutive reactions without the catalyst regeneration in between reactions. The first eight reactions were carried out over the catalyst by injecting only propane as the feed in each reaction. At the $9^{th}$ and $10^{th}$ injections, $CO_2$ was added to the propane feed. The ratio of $C_3H_8$ to $CO_2$ in the $9^{th}$ and 10th reactions were 1:2 and 1:3, respectively. The results of successive experiments are summarized in FIG. 13.

The initial propane conversion over the fresh catalyst in 1st reaction was around 48%. The propane conversion declined progressively to 30%, 27%, and 23% in the 2nd, 3rd and 4th injections. The propane conversion dropped to 20% at the fifth reaction and remained constant until the 8th reaction. The propylene selectivity increased gradually from 35% in the 1st reaction to around 45% in the 8th reaction. The decline in the propane conversion and propylene yield may be attributed to the carbon deposition on the gallium catalyst. As a result of the $CO_2$ addition, the propane conversion increased to 36% and 45% at the 9th and 10th reaction respectively. Again, the propylene selectivity was also improved due to the $CO_2$ incorporation. The increase in the conversion of propane and selectivity of propylene could be assigned to a) hydrogen removal by the $CO_2$ via RWGS reaction that shifts reaction 1 equilibrium towards the product side leading to enhanced selectivity of propylene, b) the elimination of secondary reaction by improved propylene desorption from catalyst surface, c) the role of the Boudouard reaction (reaction 4) in removing carbon formed over the catalyst surface [K. Nakagawa, C. Kajita, Y. Ide, M. Okamura, S. Kato, H. Kasuya, N. Ikenaga, T. Kobayashi, T. Suzuki, Promoting effect of carbon dioxide on the dehydrogenation and aromatization of ethane over gallium-loaded catalysts, Catal. Lett. 64 (2000) 215-221; and Y. Ren, J. Wang, W. Hua, Y. Yue, and Z. Gao, $Ga_2O_3$/HZSM-48 for dehydrogenation of propane: Effect of acidity and pore geometry of support, J. Ind. Eng. Chem. 18 (2012) 731-736, each of which is incorporated herein by reference in their entireties].

Example 22: Nature of Spent Catalyst after Evaluation

Figure 14:
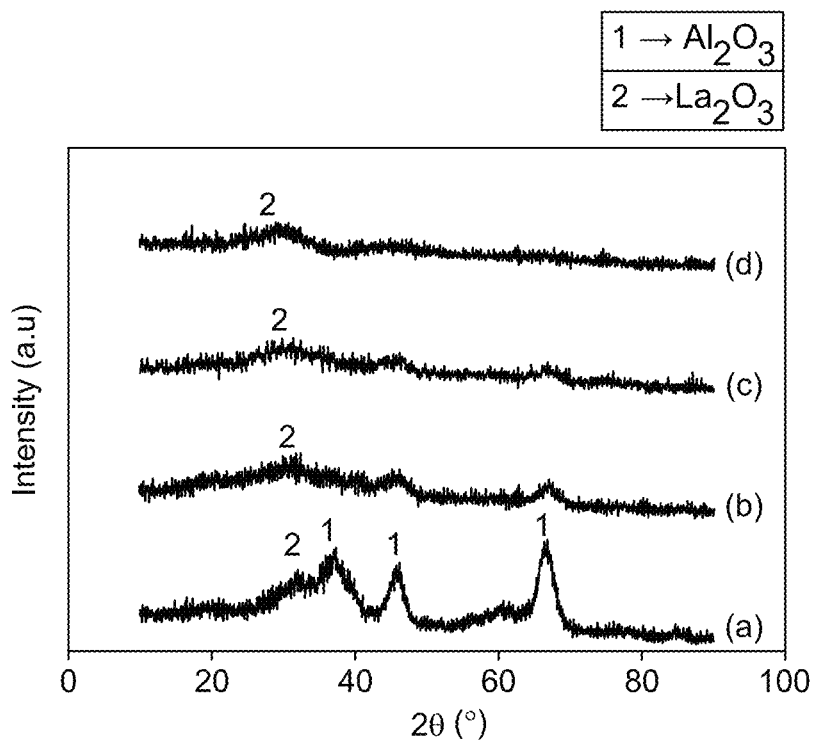
FIG. 14 shows an XRD pattern of spent $Ga_2O_3$/γ-$Al_2O_3$, $Ga_2O_3/La_2O_3$-γ-$Al_2O_3$ (1:3), $Ga_2O_3/La_2O_3$—γ—$Al_2O_3$ (1:2), $Ga_2O_3/La_2O_3$-γ-$Al_2O_3$ (1:1) catalyst, according to certain embodiments.
Figure 15:
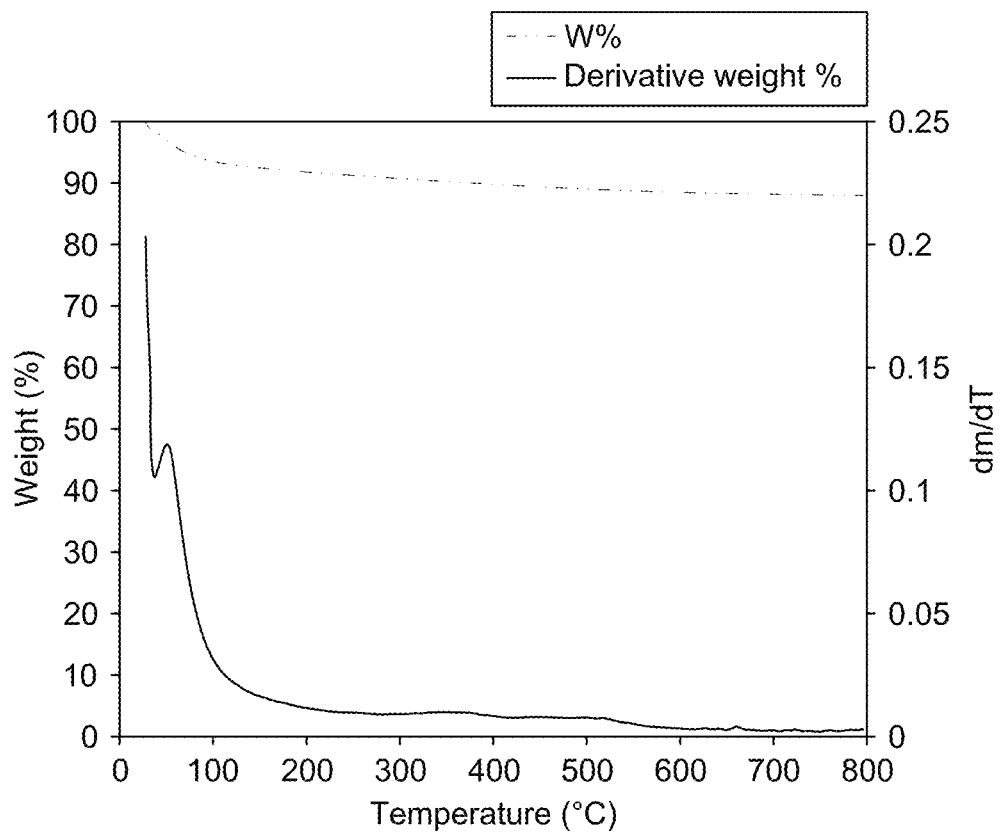
FIG. 15 shows a thermogravimetric analysis (TGA) of spent $Ga_2O_3/La_2O_3$-γ-$Al_2O_3$ (1:3) catalyst, according to certain embodiments.

The TGA and XRD analyses were used to study $Ga_2O_3$/$La_2O_3$-$\gamma$-$Al_2O_3$ catalysts after $CO_2$-assisted propane ODH. XRD profiles of spent catalysts in FIG. 14 exhibit similar diffraction patterns of fresh stimuli. This shows no structural variations in the catalysts were noticed during $CO_2$-assisted propane ODH. TGA was utilized to assess the catalyst stability with respect to coke deposition during $CO_2$-assisted propane ODH, as shown in FIG. 15. It can be observed from the TGA curve that major weight loss was observed at a temperature below 180° C. that could be ascribed to the elimination of moisture adsorbed over the catalyst surface. The absence of weight loss at higher temperatures (>180° C.) demonstrates no formation of carbon during $CO_2$-assisted propane ODH. This was consistent with no $CO_x$ detection via GC during catalyst regeneration.

To conclude, the catalytic $CO_2$-assisted propane ODH using mild oxidant over $Ga_2O_3$/$La_2O_3$-$\gamma Al_2O_3$ catalysts were synthesized, characterized before and after the reaction, and tested in a fluidized-bed Riser Simulator. The present disclosure shows the following: (i) The textural properties analysis of as-synthesized catalysts showed that the catalysts have mesoporous nature with an $H_2$ type hysteresis loop having a bottleneck-like pore with wider bodies as well as average pore size of 8 nm; (ii) the La addition had negative impact on the specific surface area of the catalysts mainly associated with pore blockage by La incorporation; (iii) the reduction profiles indicated that La-free $Ga_2O_3$/$\gamma Al_2O_3$ catalyst exhibited reduction of gallium oxide while single-step reduction profiles of $Ga_2O_3$/$La_2O_3$-$\gamma Al_2O_3$ catalysts suggest the presence of largely homogeneous reducible species. Moreover, La addition improved catalyst reducibility; (iv) the acidity measurement by $NH_3$-TPD demonstrated that La-free $Ga_2O_3$/$\gamma Al_2O_3$ catalyst had both weak and strong acid sites. However, La incorporation reduced the number of weak acid sites while enhancing strong acid sites. Moreover, the amount of $NH_3$ uptake increased with La incorporation only for strong acid sites (high-temperature acidity); (v) regardless of reaction temperature, the relatively higher propane conversion of $Ga_2O_3$/$La_2O_3$-$\gamma Al_2O_3$ (1:1) catalyst during propane ODH was attributed to higher number of reducible species of this catalyst; (vi) the $CO_2$-assisted propane ODH showed that the mild oxidant not only promoted its interaction with hydrocarbon feed but also re-oxidized the pre-reduced catalyst, hence improved both the conversion, yield and selectivity; and (vii) the adsorbed $CO_2$ facilitated non-selective site masking that contributed in improved selectivity towards olefins.

Numerous modifications and variations of the present disclosure are possible in light of the above teachings. It is therefore to be understood that within the scope of the appended claims, the invention may be practiced otherwise than as specifically described herein.

The invention claimed is:

1. A method for producing propylene ($C_3H_8$) via oxidative dehydrogenation (ODH) of propane, comprising:
   introducing a propane-containing feed gas stream into a reactor containing an alumina supported $Ga_2O_3$/$La_2O_3$ catalyst comprising $Ga_2O_3$ particles at least partially disposed on surfaces of a matrix comprising rough and irregular sized $La_2O_3$ and alumina particles;
   passing the propane-containing feed gas stream through the reactor in contact with the alumina supported $Ga_2O_3$/$La_2O_3$ catalyst at a temperature of 500 to 600° C. to convert at least a portion of the propane to propylene ($C_3H_6$) and produce a propylene-containing gas stream leaving the reactor; and
   separating the propylene from the propylene-containing gas stream;
   wherein the method has a propane conversion of up to 95% based on an initial weight of the propane in the propane-containing feed gas stream; and
   wherein the method has a propylene yield of up to 60% based on the propane conversion,
   wherein the reactor is a fixed-bed reactor in the form of a cylindrical reactor comprising:
   a top portion;
   a cylindrical body portion;
   a bottom portion;
   a housing having an open top and open bottom supportably maintained with the cylindrical body portion;
   wherein the alumina supported $Ga_2O_3$/$La_2O_3$ catalyst is supportably retained within the housing permitting fluid flow therethrough;
   at least one propeller agitator is disposed in the bottom portion of the reactor;
   wherein the bottom portion is cone shaped or pyramidal; and
   wherein a plurality of recirculation tubes fluidly connects the bottom portion of the cylindrical reactor with the cylindrical body portion of the cylindrical reactor.

2. The method of claim 1, wherein the $C_3H_8$ is present in the propane-containing feed gas stream at a concentration of 20 to 99 vol. % based on a total volume of the propane-containing feed gas stream.

3. The method of claim 1, wherein the propane-containing feed gas stream further comprises carbon dioxide ($CO_2$), and wherein a volume ratio of $C_3H_8$ to $CO_2$ present in the propane-containing feed gas stream is in a range of 1:1 to 1:4.

4. The method of claim 1, wherein the alumina supported $Ga_2O_3/La_2O_3$ catalyst is at least one of a gamma-alumina supported $Ga_2O_3/La_2O_3$ catalyst ($Ga_2O_3/La_2O_3$-$\gamma$-$Al_2O_3$), an alpha-alumina supported $Ga_2O_3/La_2O_3$ catalyst ($Ga_2O_3/La_2O_3$-$\alpha$-$Al_2O_3$), and a delta-alumina supported $Ga_2O_3/La_2O_3$ catalyst ($Ga_2O_3/La_2O_3$-$\delta$-$Al_2O_3$).

5. The method of claim 1, wherein the alumina supported $Ga_2O_3/La_2O_3$ catalyst is $Ga_2O_3/La_2O_3$-$\gamma$-$Al_2O_3$ catalyst having a mesoporous structure, and wherein the $Ga_2O_3$ particles of the $Ga_2O_3/La_2O_3$-$\gamma$-$Al_2O_3$ catalyst form a layer disposed on surfaces of the matrix comprising rough and irregular sized $La_2O_3$ and $\gamma$-$Al_2O_3$ particles.

6. The method of claim 1, wherein the alumina supported $Ga_2O_3/La_2O_3$ catalyst comprises particles having a micropore area in a range of 2 to 20 square meter per gram ($m^2/g$).

7. The method of claim 1, wherein the alumina supported $Ga_2O_3/La_2O_3$ catalyst comprises particles having a specific surface area in a range of 30 to 150 square meter per gram ($m^2/g$).

8. The method of claim 1, wherein the alumina supported $Ga_2O_3/La_2O_3$ catalyst comprises particles having a total pore volume in a range of 0.1 to 0.3 cubic centimeter per gram ($cm_3/g$).

9. The method of claim 1, wherein the alumina supported $Ga_2O_3/La_2O_3$ catalyst comprises particles having an average pore diameter in a range of 5 to 15 nanometers (nm).

10. The method of claim 1, wherein the alumina supported $Ga_2O_3/La_2O_3$ catalyst has an ammonia temperature-programmed desorption ($NH_3$-TPD) of 0.35 to 0.5 millimoles per gram (mmol/g).

11. The method of claim 1, wherein the propylene-containing gas stream leaving the reactor further comprises ethylene, methane, ethane, propane, carbon monoxide, and carbon dioxide.

12. The method of claim 1, wherein the method further comprises preparing the $Ga_2O_3/La_2O_3$-$\gamma$-$Al_2O_3$ catalyst by:
  mixing an aluminum salt and a lanthanum salt in water to form a first mixture;
  adjusting a pH of the first mixture to 8.5 by adding an ammonium salt;
  heating the first mixture after adjusting the pH to precipitate a precursor composite from the first mixture;
  separating the precursor composite from the first mixture and calcining the precursor composite at a temperature of about 500° C. to form a $La_2O_3$-$\gamma$-$Al_2O_3$ support;
  wherein the $La_2O_3$-$\gamma$-$Al_2O_3$ support comprises rough and irregular sized $La_2O_3$ and $\gamma$-$Al_2O_3$ particles, and wherein the $\gamma$-$Al_2O_3$ particles have a particle size in a range of 1 to 150 micrometers ($\mu m$);
  mixing a gallium salt and the $La_2O_3$-$\gamma$-$Al_2O_3$ support in water to form a second mixture; and
  drying the second mixture and calcining the second mixture at a temperature of about 500° C. to deposit $Ga_2O_3$ particles on surfaces of the $La_2O_3$-$\gamma$—$Al_2O_3$ support thereby generating the $Ga_2O_3/La_2O_3$-$\gamma$—$Al_2O_3$;
  wherein the $Ga_2O_3$ particles present in the $Ga_2O_3/La_2O_3$-$\gamma$-$Al_2O_3$ are in the form of a layer having an average thickness of 50 to 1000 nm.

13. The method of claim 12, wherein a molar ratio of the $La_2O_3$ to the $\gamma$-$Al_2O_3$ present in the $La_2O_3$-$\gamma$-$Al_2O_3$ support is in a range of 1:1 to 1:3.

14. The method of claim 12, wherein a weight ratio of the gallium salt to the $La_2O_3$-$\gamma$-$Al_2O_3$ support is in a range of 1:5 to 1:15.

15. The method of claim 12, wherein the aluminum salt comprises aluminum sulfate, aluminum nitrate, aluminum chloride, aluminum acetate, aluminum carbonate, aluminum phosphate, and/or a hydrate thereof.

16. The method of claim 12, wherein the lanthanum salt comprises lanthanum sulfate, lanthanum nitrate, lanthanum chloride, lanthanum acetate, lanthanum carbonate, lanthanum phosphate, and/or a hydrate thereof.

17. The method of claim 12, wherein the gallium salt comprises gallium sulfate, gallium nitrate, gallium chloride, gallium acetate, gallium carbonate, gallium phosphate, and/or a hydrate thereof.

18. The method of claim 12, wherein the ammonium salt comprises ammonium carbonate, ammonium hydrogen carbonate, ammonium acetate, ammonium hydroxide, and/or a hydrate thereof.

* * * * *